United States Patent
Brandt, Sr. et al.

(10) Patent No.: US 11,000,154 B1
(45) Date of Patent: May 11, 2021

(54) LOW OXIDE STRUCTURES

(71) Applicants: Dale A Brandt, Sr., Vero Beach, FL (US); Dale A Brandt, Jr., Vero Beach, FL (US)

(72) Inventors: Dale A Brandt, Sr., Vero Beach, FL (US); Dale A Brandt, Jr., Vero Beach, FL (US)

( * ) Notice: Subject to any disclaimer, the term of this patent is extended or adjusted under 35 U.S.C. 154(b) by 0 days.

(21) Appl. No.: 16/160,307

(22) Filed: Oct. 15, 2018

Related U.S. Application Data

(60) Provisional application No. 62/572,457, filed on Oct. 14, 2017.

(51) Int. Cl.
F24C 15/10 (2006.01)
A47J 37/07 (2006.01)

(52) U.S. Cl.
CPC ....... *A47J 37/0713* (2013.01); *A47J 37/0786* (2013.01); *A47J 2037/0777* (2013.01)

(58) Field of Classification Search
CPC .................................................. A47J 37/0713
USPC ........................................ 126/37 B, 50, 41 R
See application file for complete search history.

(56) References Cited

U.S. PATENT DOCUMENTS

| | | | |
|---|---|---|---|
| 4,590,360 A * | 5/1986 | Maitenaz | F24C 15/34 126/273 R |
| 5,163,359 A | 11/1992 | McLane, Sr. | |
| 5,960,782 A | 10/1999 | Clements | |
| 6,293,272 B1 | 9/2001 | Harneit | |
| 8,286,352 B1 * | 10/2012 | Ray | A01G 13/0225 29/897.31 |
| 9,402,508 B2 | 8/2016 | Cothern | |
| 2004/0065313 A1 * | 4/2004 | Thompson | A47B 77/02 126/37 R |
| 2005/0098168 A1 | 5/2005 | Williams | |
| 2008/0163862 A1 * | 7/2008 | Cartwright | A47B 55/00 126/25 R |
| 2013/0113343 A1 * | 5/2013 | Singlak | A47B 77/00 312/100 |
| 2014/0053823 A1 | 2/2014 | Frantz | |
| 2014/0338655 A1 | 11/2014 | Doyle | |
| 2018/0010808 A1 * | 1/2018 | Mill | F24C 15/08 |

* cited by examiner

*Primary Examiner* — Avinash A Savani
(74) *Attorney, Agent, or Firm* — William Simmons; Simmons Patents

(57) ABSTRACT

The disclosed technology addresses durability issues with structures that are to be used in environments that are hostile to the materials used to construct such structures. One example is a structure configured to house a grilling element and configured to be used in an outdoor grilling environment. The Materials used define an overall low oxide structure that is also resistant to structural damage by life forms such as insects. The structure further provides adjustable firebox features and a venting system to make the structure more universal than prior art devices with regard to regulatory venting requirements. The disclosed technology also provides for electronic monitoring.

17 Claims, 21 Drawing Sheets

LOW OXIDE STRUCTURES

CLAIM TO PRIORITY

This application claims priority to U.S. provisional application 62/572,457, filed 14 Oct. 2017, which is incorporated by this reference for all that it discloses for all purposes.

TECHNICAL FIELD

The invention relates to novel ornamental and utilitarian features of designer low oxide structures for indoor and outdoor use. Such low oxide structures are particularly well suited for outdoor uses such as cabinetry for grills and boats.

BACKGROUND OF THE INVENTION

There are many structures, such as cabinetry, that are useful outdoors and in other environments hostile to the materials used to construct such structures. Consequently, many prior art enclosed cabinets for outdoor kitchens and dry storage pantries, for example, allow one to store dry goods, cookware, cookbooks, and other grilling necessities, all outside and in a water-tight environment. Most enclosed cabinets include shelving and drawers so one can keep one's outdoor kitchen tidy and organized. When considering the design goals of out-door structures, water-resistance and durability are important factors. While prior art out-door structures intended for such hostile environments are often named "rot-proof" and or "rust-proof," such structures are only resistant to rot and rust.

As is well known, "rot-resistant" is a condition of preservation or protection by a process or treatment of materials (such as wood) used in industrial manufacturing or production to prevent biodegradation and chemical decomposition. Decomposition is a factor in which organic matter breaks down over time and is commonly caused by fungus, mold, or mildew. Similarly, "Rust-proofing" is the prevention or delay of rusting of iron and steel objects. Typically, prior art methods of protection strive for the goals of "rot-proof" and or "rust-proof" involve a process of surface finishing or treatment.

Another prior art method of making durable out door structures is to use material such as stainless steel. Stainless steel, also known as "inox steel" does not stain, corrode, or rust as easily as ordinary steel. DeLorean cars, as one example, have stainless steel bodies. While stainless steel was used in framing, the material associated with such stainless steel degrade over time unless the decay prevention process is periodically used.

Another shortcoming of prior art structures used to house outdoor grills relates to ventilation. Gas grills include some ventilation scheme to vent gas leaked by a gas source to prevent gas build-up and explosion. Some grills use a signal ventilation element such as a series of vertically aligned holes or horizontally aligned holes. Such ventilation is usually configured to comply with local law related to the issue. However, what the prior art grill structures do not do is adequately address horizontal, vertical, and cross ventilation in a way that defines both a safer ventilation system and a more universal ventilation system that complies with laws in different areas covering different markets without the need for modification.

The disclosed technology addresses durability issues with structures that are to be used in environments that are hostile to the materials in the construction of such structures by using materials that define an overall low oxide structure that is also resistant to structural damage by life forms such as insects. The structure further provides adjustable features and a venting system to make it more universal than prior art devices. The disclosed technology also provides for electronic monitoring.

SUMMARY OF THE INVENTION

Some of the objects and advantages of the invention will now be set forth in the following description, while other objects and advantages of the invention may be obvious from the description, or may be learned through the practice of the invention.

Broadly speaking, a principle object of the present invention is to provide a universal configurable structure constructed of low oxide materials that does not rust or rot without the need to periodically apply a protective process.

A still further object of the invention is to provide a universal configurable structure constructed of a low oxide material configured to provide vertical venting, horizontal venting, and cross venting configured to comply with a plurality of venting requirements.

Yet another object of the invention is to provide a universal vented configurable structure constructed of low oxide materials comprising an adjustable firebox configured to receive heat generating elements.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps or features hereof may be practiced in various uses and embodiments of this invention without departing from the spirit and scope thereof, by virtue of the present reference thereto. Such variations may include, but are not limited to, the substitution of equivalent steps, referenced or discussed, and the functional, operational, or positional reversal of various features, steps, parts, or the like. Still, further, it is to be understood that different embodiments, as well as different presently preferred embodiments, of this invention, may include various combinations or configurations of presently disclosed features or elements or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
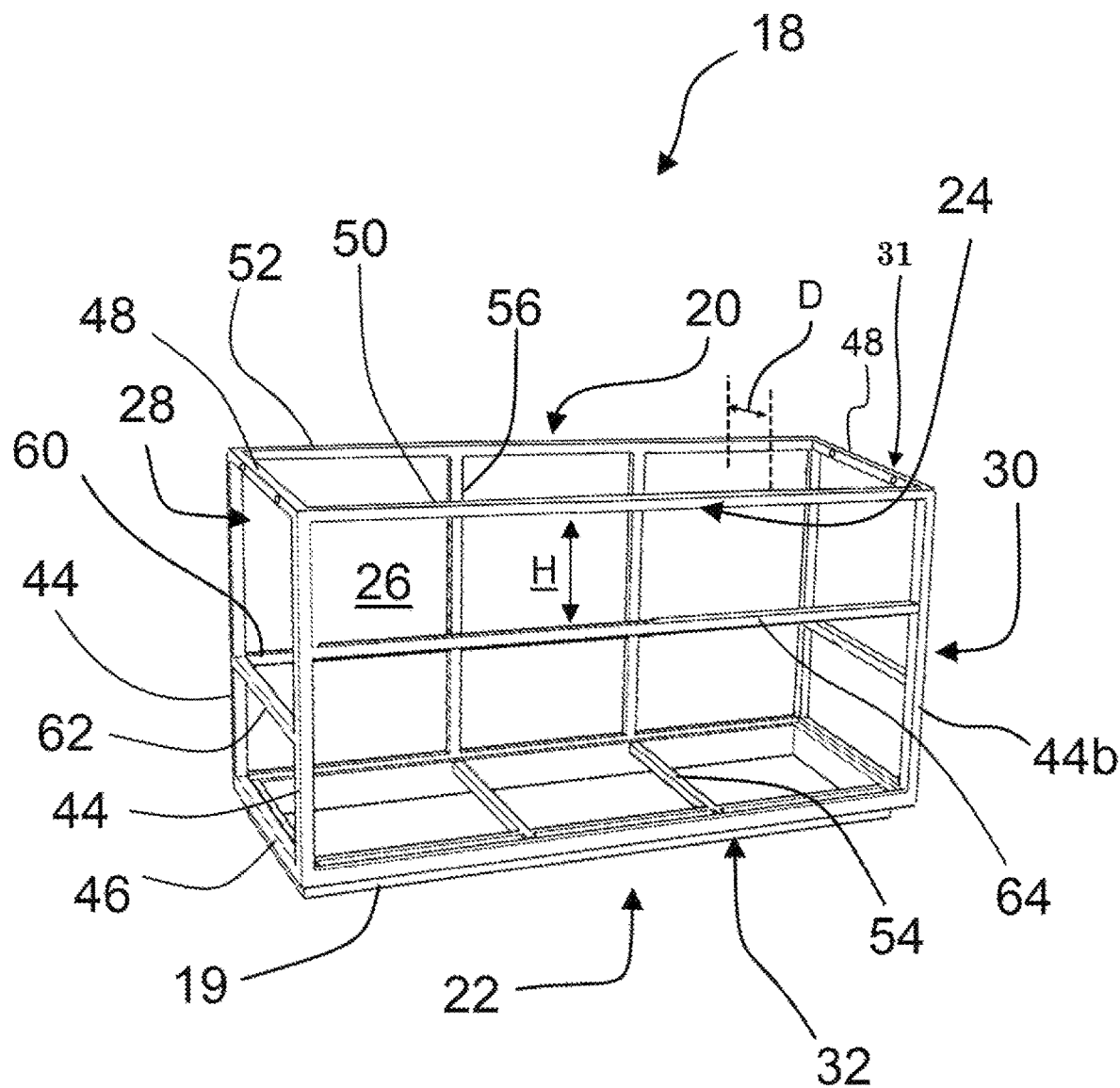
FIG. 1 is a front perspective view of a frame for a main housing component.

Repeat use of reference characters throughout the present specification and appended drawings is intended to represent the same or analogous features or elements of the present technology.

DISCLOSURE OF THE INVENTION

Detailed Description

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent the same or analogous features, elements, or steps. It is to be understood by one of ordinary skill in the art that the present discussion is a description of exemplary embodiments only and is not intended as limiting the broader aspects of the present invention.

Construction Aids

For the purposes of this document, two or more items are "mechanically associated" by bringing them together or into a relationship with each other in any number of ways, including a direct or indirect physical "releasable connections" (snaps, screws, Velcro®, bolts, clamps, etc.—generally connections designed to be easily and frequently released and reconnected), "hard-connections" (welds, rivets, macular bonds, generally connections that one does not anticipate disconnecting very often if at all—a connection that is "broken" to separate), and/or "moveable connections" (rotating, pivoting, oscillating, etc.).

Similarly, two or more items are "electrically associated" by bringing them together or into a relationship with each other in any number of ways including (a) a direct, indirect, or inductive communication connection, and (b) a direct/indirect or inductive power connection. Additionally, while the drawings may illustrate various electronic components of a system connected by a single line, it will be appreciated that such lines may represent one or more signal paths, power connections, electrical connections, and/or cables as required by the embodiment of interest.

For the purposes of this document, unless otherwise stated, the phrase "at least one of A, B, and C" means there is at least one of A, or at least one of B, or at least one of C or any combination thereof (not one of A, and one of B, and one of C).

As used herein, the terms "first," "second," and "third" may be used interchangeably to distinguish one component from another and are not intended to signify the location or importance of the individual components.

Any two polygons are similar if their corresponding angles are congruent and the measures of their corresponding sides are proportional. Similar polygons have the same shape but can be different sizes. For the purpose of this document, circles are defined by a series of line segments and, therefore, polygons.

This document includes headers that are used for place markers only. Such headers are not meant to affect the construction of this document, do not in any way related to the meaning of this document, nor should such headers be used for such purposes.

DESCRIPTION

While the particulars of the present invention and associated technology may be adapted for use for any type of indoor/outdoor storage cabinet, the examples discussed herein are primarily in the context of outdoor cabinets associated with a grill.

Referring now more particularly to FIG. 1-FIG. 4, a universal Vented Configurable Structure (VCS) (10) is presented. For the embodiment depicted in FIG. 2, VCS (10) comprises a main housing component (12) that defines the center of the structure and is configured for receiving a grill element (6). The main housing component (12) is further associated with a first accessory module (14) and a second accessory module (16) mechanically associated with opposite sides of the main housing component (12) (discussed in more detail later). The main housing component (12) and accessory modules are configured to support a top element (21a, FIG. 2), (21b, FIG. 3), and/or (21c, FIG. 4) referred to collectively as top element (21).

Figure 2:
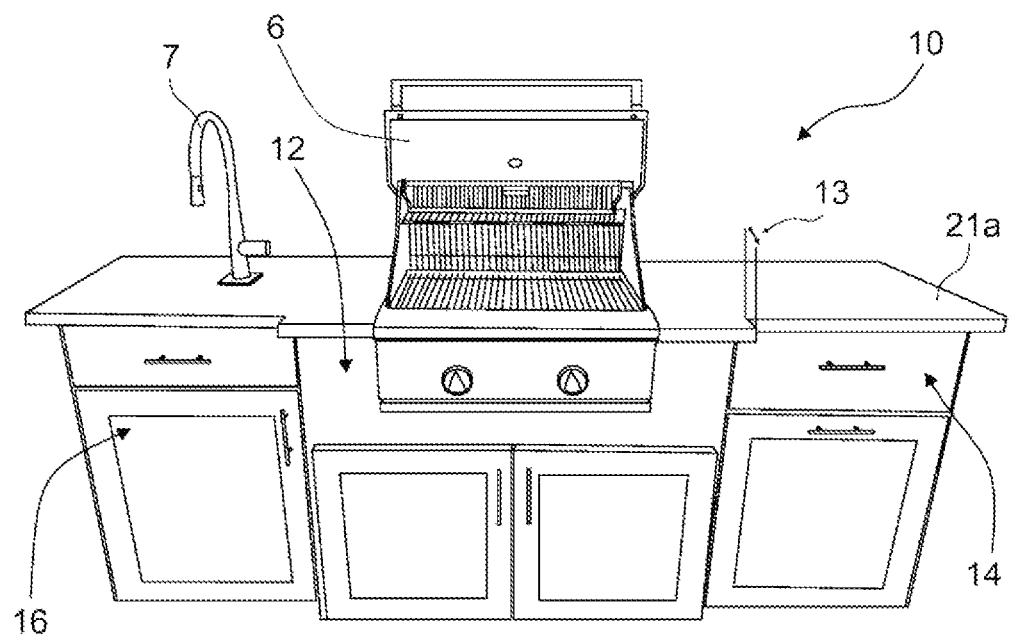
FIG. 2 is a front perspective view of one exemplary embodiment of a configurable cross vented structure.
Figure 3:
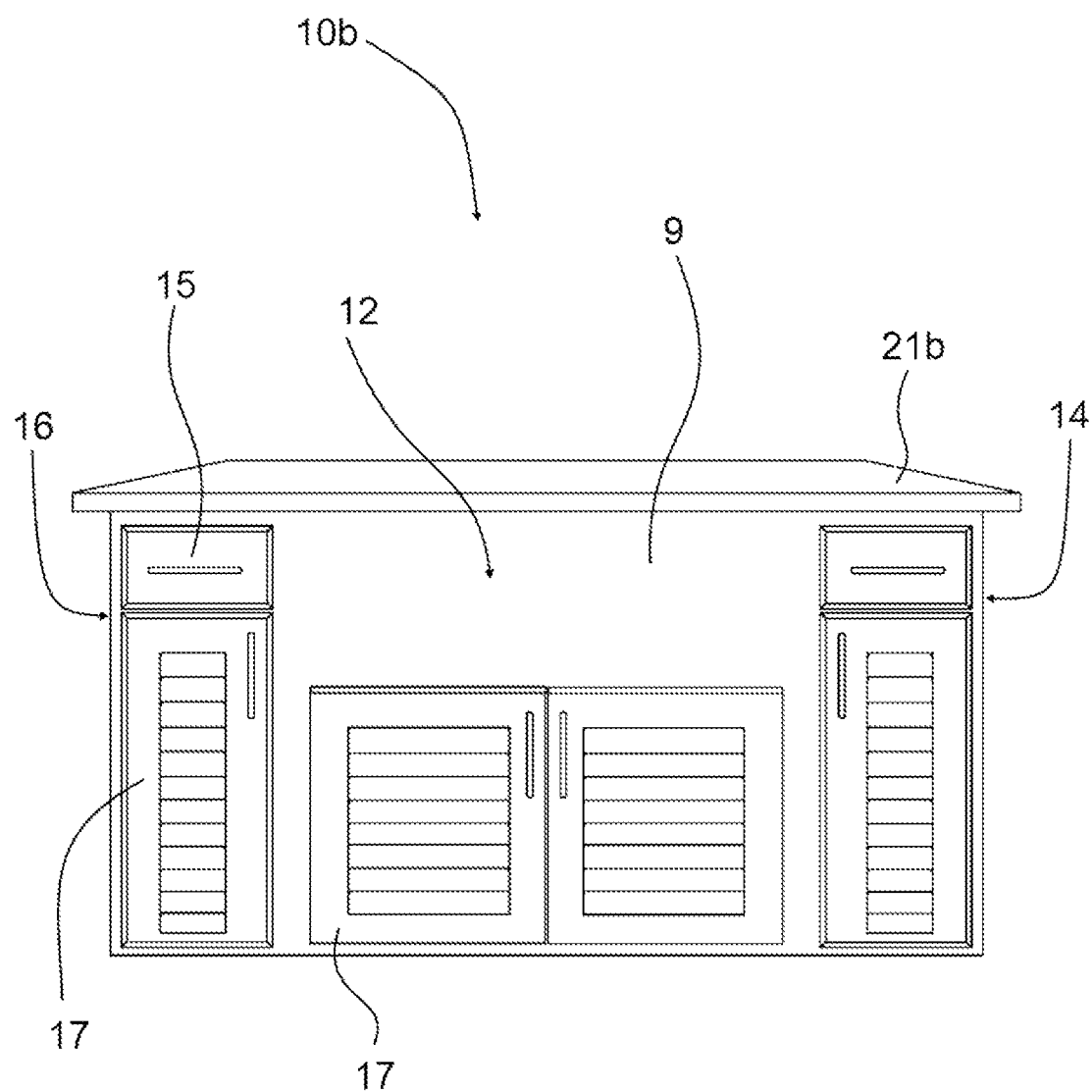
FIG. 3 is a front slightly elevated perspective view of one exemplary alternative embodiment of a configurable vented structure without a grill element.
Figure 4:
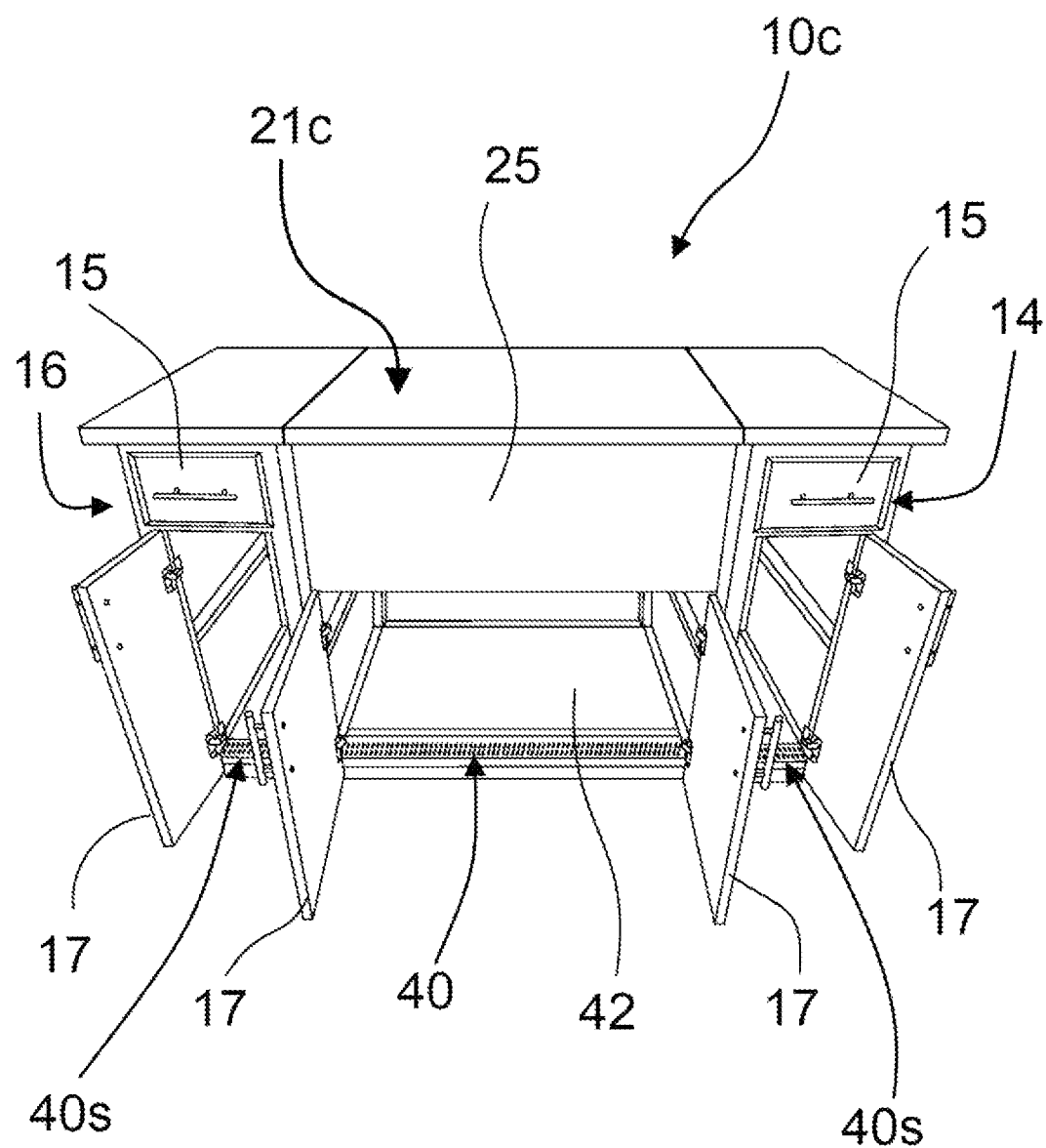
FIG. 4 is a view of FIG. 3 with drawer elements open revealing the internal voids of the configurable cross vented structure and having a top element with a plurality of sections.

Referring now more particularly to FIG. 2 through 4, two slightly different configurations are presented. First, as depicted in FIG. 2, some users desire an "offset" (13) configuration where the front of the main housing component (12) extends beyond the front of the first accessory module (14) and second accessory module (16). FIG. 3 shows a second configuration where the front of the main component is in alignment with the accessory modules. FIG. 4 shows a variation on the embodiment of FIG. 3 comprising a top (21c) composed of a plurality of sections.

For the preferred embodiment, the main housing component (12) is configured to mechanically associate with accessory modules in either the offset configuration or no offset configuration with no material structural modifications needed to the main housing component (12) (simply use different sized accessory modules). Here, the phrase "no material structural modifications" means there may be some changes to non-structural items such as the cladding or adding hinges, but there are no material changes to the frame that defines the support structure making the main structure a more universal structure.

Figure 5:
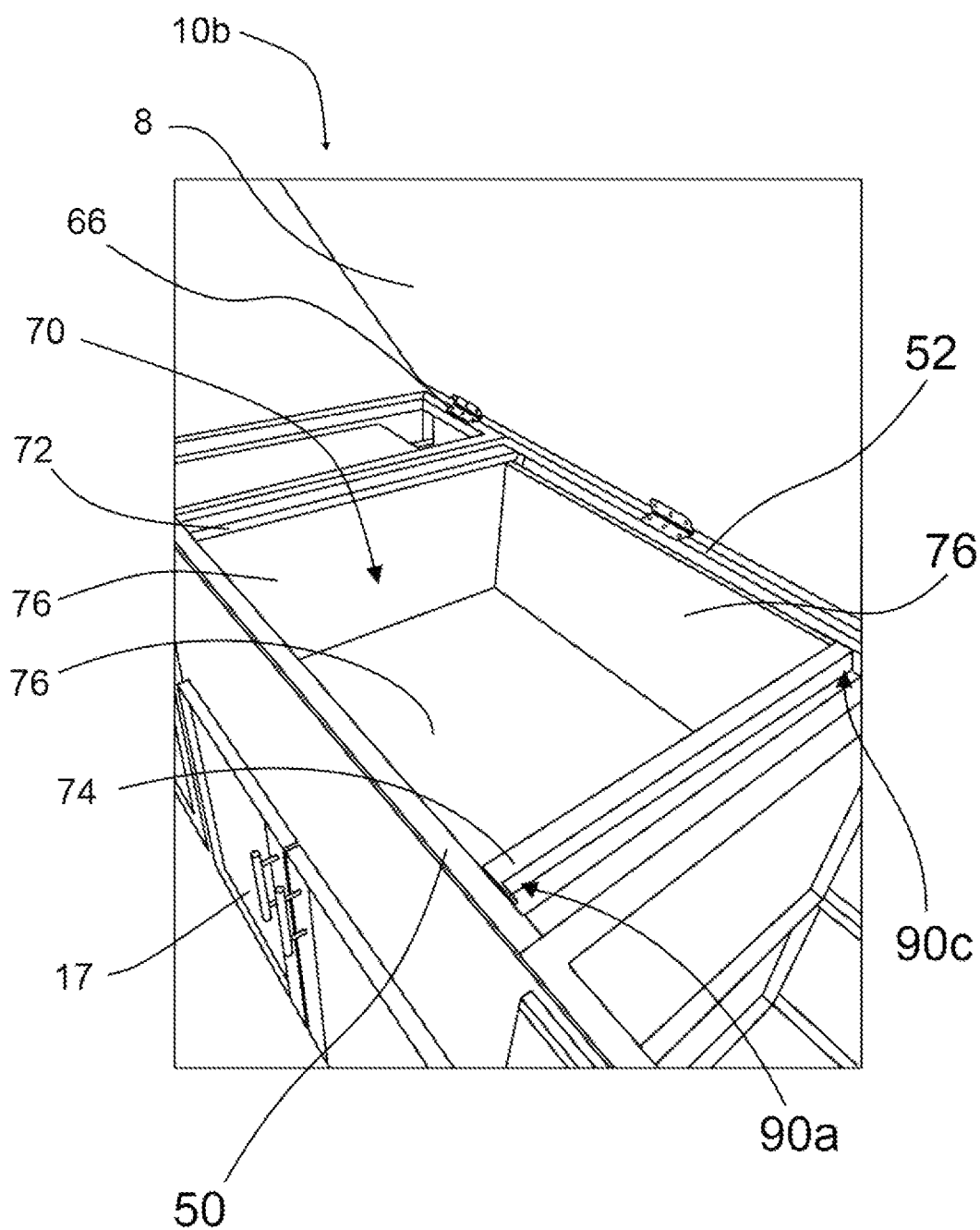
FIG. 5 is a view of FIG. 3 with a hinged one-piece top element in an open position revealing the internal voids of the configurable vented configurable structure.

One will also note that FIG. 2 is configured to house a grill element (6) and an accessory element (7), while FIG. 3 depicts a VCS (10b) system configured with a flat one-piece top element (21b) and no grill element or accessory element. Further, the VCS (10b) system defines a top element (21b) associated with the frame (18) with optional hinge elements (66) (as seen in FIG. 5) that allow the top element (21b) to be lifted to gain access to compartments below the top element (21b). Similarly, FIG. 4 shows a VCS (10c) configuration where the top element (21c) comprises a plurality of sections where individual sections may be hinged to frame (18) (or perhaps just the center section is hinged, for example). One of ordinary skill in the art will appreciate that when the top element (21b, 21c) is hinged to the frame (18), access to the void defined by drawer element (15) under such top element may be gained by either lifting the top element or pulling out the associated drawer element (15).

The VCS (10b, 10c) system defines a cutout element (25) that a user may cut out (or not) as needed to receive an item such as a grill element (6). To allow for such modifications, the VCS (10b, 10c) defines an adjustable firebox (70) that provides for at least two options: (1) a fire safe-space to house a heat generator (gas grill, portable grills, electric grills, etc.); and (2) the VCS (10b, 10c) system is made universal so that a user can cut out a section of top-element (21) and insert a grill-element (6) to achieve the configuration depicted in FIG. 2. Notably, the VCS (10) system depicted in FIG. 2 also defines an adjustable firebox (70) occupied by a grill element (6) which is described in detail below.

FRAME

The previous discussion depicted an-end product that uses the universal framing technology and novel cladding technology disclosed in this document. Attention will now be directed to the novel main housing component frame and cladding features that make the end product possible.

Figure 6:
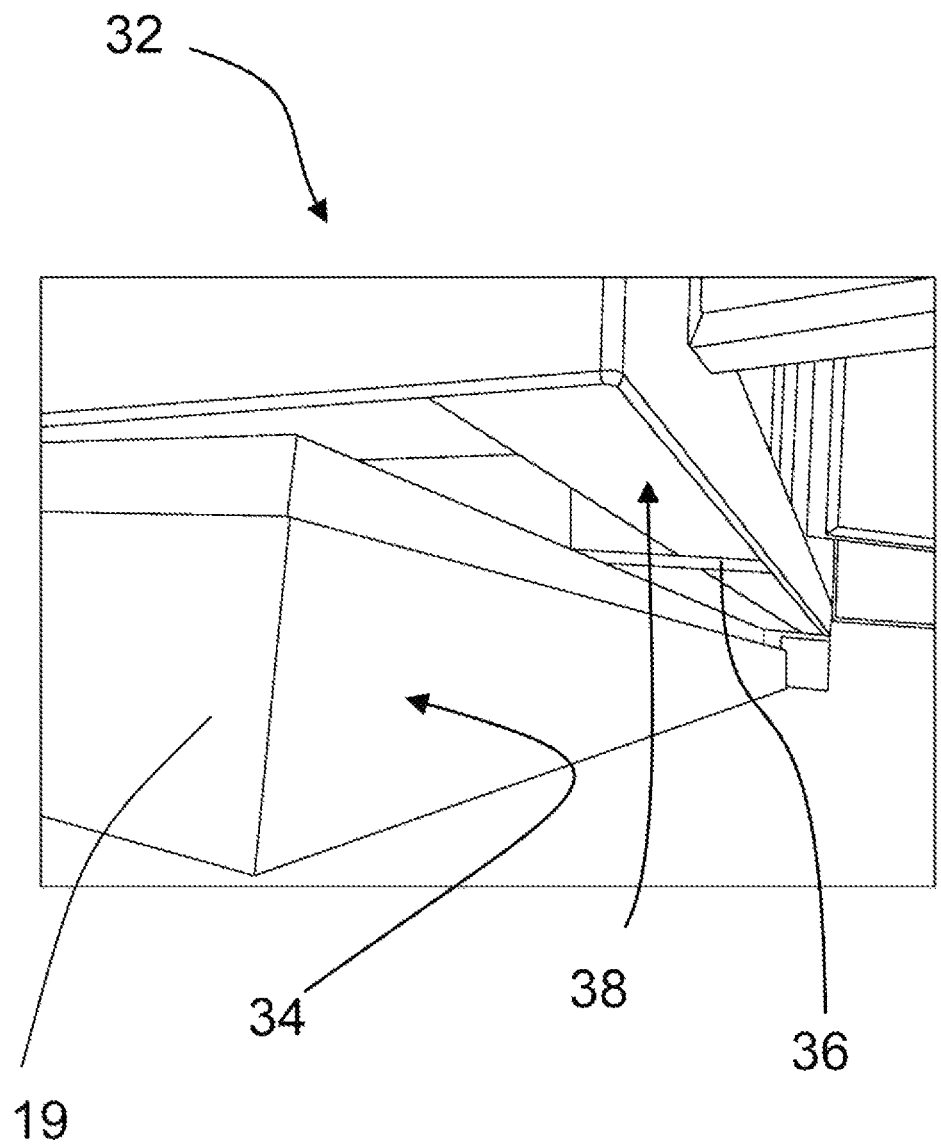
FIG. 6 depicts an exemplary toe space area defining horizontal venting voids.

Referring back to FIG. 1, the main housing component (12) comprises a housing frame (18) defining a top portion (20), a bottom portion (22), front portion (24), a back portion (26), left portion (28) and a right portion (30). It will be appreciated that the left portion (28) and the right portion (30) may be referred to individually and collectively as side portions. The front portion (24) preferably defines a toe space area (32) along the lower part of the front portion (24), as depicted in FIG. 1. As best seen in FIG. 6, such toe space area (32) comprises a vertical section (34) and a horizontal section (36) wherein the horizontal section (36) defines a venting-void (38) which defines a toe space venting region (described in more detail later).

The outer surfaces of the frame (18) are preferably suitably configured to received cladding material (9, FIG. 3) to define a decorative surface as described in more detail later and to provide venting such as a vertical venting feature (39, FIG. 25) or vertical venting module (37, FIG. 26). Notably, such a "vertical" venting feature can become a "horizontal" venting feature depending on its orientation. For example, the vertical venting feature (39) could be associated with the toe space area (32) venting void (38), thereby defining a horizontal venting feature. Thus, "vertical" simply means a component (such as toe space "vertical section 34") that defines a plane perpendicular to the support surface that the support portion (19) rests upon. Similarly, "horizontal" means a component (such as toe space "horizontal section 36") that defines a plane parallel to the support surface that the support portion (19) rests upon.

The top portion (20) is configured to receive any suitable top element (21) as described above.

The top portion (20) comprises four rails: two opposing top side rails (48) of equal length, a front top rail (50), and opposing back top rail (52) connected at their ends to the top side rails to define a "flat" generally rectangular shape as depicted in FIG. 1. Here, "flat" means that when the frame (18) is leveled on a level support surface and when one places a generally flat top element (21) on top of the top portion (as best seen in FIG. 3), such top element will also be level and resting on, and supported by, all four top rails. For the preferred embodiment, the top side rails are equal in length to each other and shorter than the top front rail and the top back rail (which themselves are equal in length) to define the generally rectangular shape depicted in FIG. 1.

The frame is preferably constructed from structural welded aluminum framing rails (or a material with an oxidation state of around 3+ or better). For top-element (21), any suitable material that meets desired durability requirements may be used, including tops made of granite, quartz, laminate, concrete, glass, marble, solid synthetic material, resin, stainless, porcelain, and fiberglass-based materials.

Referring now to the bottom portion (22), it comprises four rails similar to the top portion (20) configured to define a similar polygonal shape compared to the top portion (20) where the bottom portion is mechanically associated with (or defines an integral) support portion (19) which defines a support interface (23) (described in detailed later) configured for being associated with a support surface (such as a floor).

The bottom portion (22) (or support portion) may further define one or more horizontal bottom-cross-rails (54) running from the front to the back of the frame (18) to enhance structural integrity. Similarly, the back portion (26) may further define one or more vertical support rails (56) to enhance structural integrity where one end of such vertical support rail (56) is mechanically associated with the bottom back rail and extends vertically to where the opposing end is mechanically associated with the back-top-rail (52) to created right angles with same as depicted in FIG. 1.

Side portions left portion (28) and a right portion (30), define two similar side structures disposed at opposite sides of the frame (18), each comprising at least two vertical side rails (44) with one vertical side rail (44) extending from one corner of a bottom side rail (46), defined by the bottom portion (22), to one corner of a top side rail (48), defined by top portion (20), to define a generally rectangular shape (although any shape may be used). One of ordinary skill in the art will appreciate that the "top side rails," which are described as being part of the top portion (20), could be considered part of the side portions without departing from the scope and spirit of the invention. The outer surface of the right portion (30) and the left portion (28) are at least one of: (a) configured for being associated with a wall-element, or (b) associated with said cladding material, thereby defining a side cladding material and wherein said the cladding material defines a vertically extending vent region (e.g., 41a, FIG. 13), or (c) are configured with a housing interface (31) configured for being mechanically associated with a module interface (100, 101).

The back portion (26), left portion (28), and a right portion (30) preferably each define a horizontal mid-rail at equal distances from the top portion (20) as depicted in FIG. 1. A back portion (26) defines back-mid-rail (60) connecting the back side vertical side rail (44) of a left portion (28) and back side vertical side rail (44) of a right portion (30) and running parallel to the back-top-rail (52). The left portion and right portion each define side-mid-rails (62), connecting the vertical side rails (44) together and running parallel to the top side rail (48). Similarly, the front portion (24) further defines a front inner rail (64) running parallel to the front-top rail (50) where one end is associated with a first vertical side rail (44) and the other opposing end associated with a second side rail (44b). Such mid-rails and inner rail enhance structural integrity, provide an attachment point for accessory modules and give a point to mechanically associate cladding to frame (18) as defined later while providing a cross ventilation path as described below.

One of ordinary skill in the art will appreciate that there are many ways to configure the main housing component frame without departing from the scope and spirit of the invention.

Figure 25:
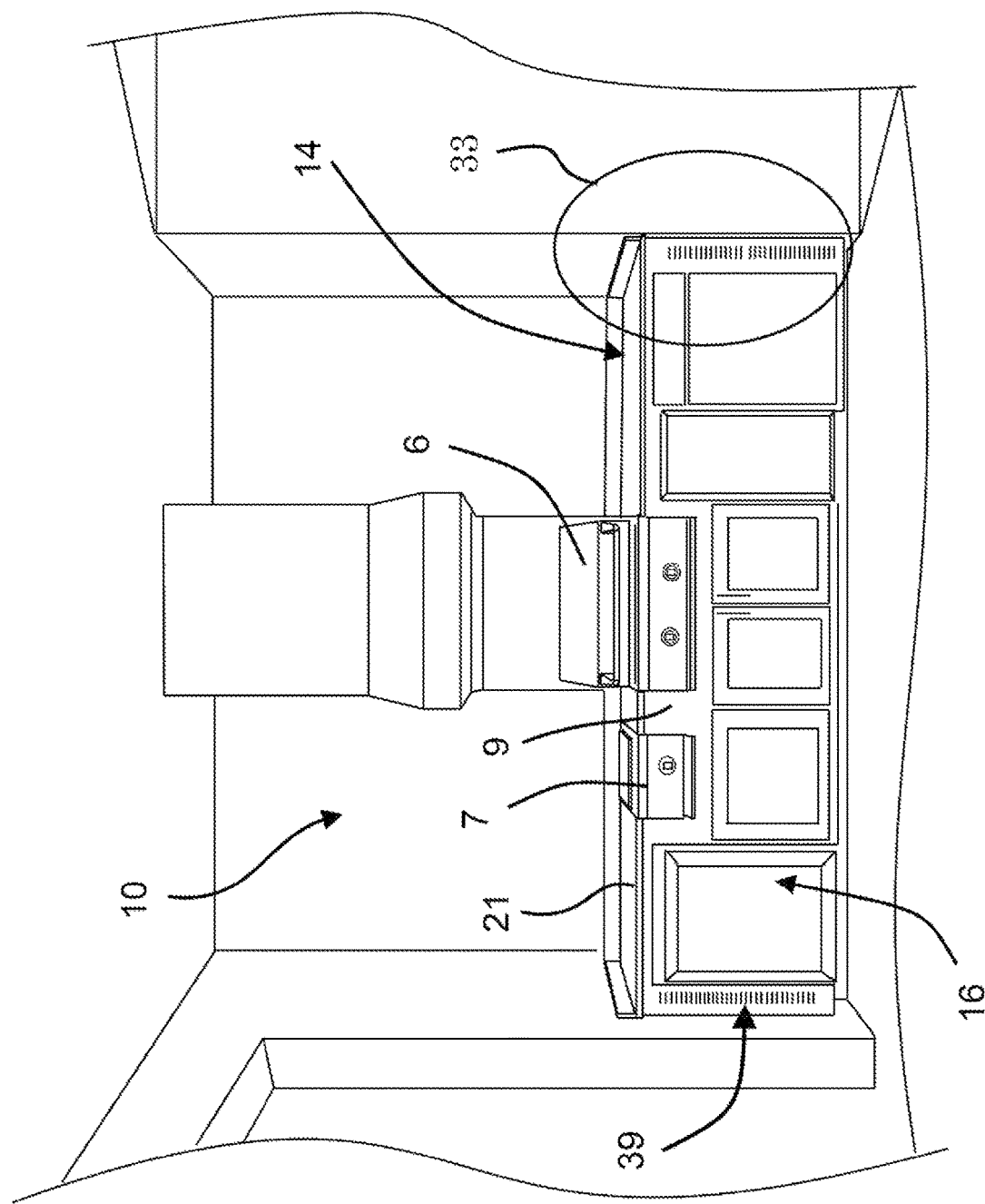
FIG. 25 is a front perspective view of one exemplary embodiment of a configurable cross vented structure installed between three walls and showing vertical venting elements.

The outer surfaces of the side portions and back portion are configured to provide a generally flat surface suitable for being mechanically associated with a cladding material (9) as described in more detail below. That said, as best seen in FIG. 25, for some installations, one or more outer surfaces may be mechanically associated with a vertical surface/structure (such as a wall or an accessory component) and may or may not touch the vertical wall (positioned close/adjacent to) so that the side is not touching the wall and not normally visible when the VCS (10) system is installed. The back portion of the VCS (10) system, for example, is the most likely portion to be installed adjacent to a wall-type structure. The side portions (of frame (18)) are most likely to be associated with an accessory module (14, 16) where the opposing sides of such accessory module are positioned adjacent to a wall. When a portion of the VCS (10) system is to be associated with a vertical surface (such as a wall) to reduce costs or improve air flow, cladding material is not normally associated with such surface. That said, for the preferred embodiment and to make the design more universal, the outer surfaces of the back portion and side portions are configured for both uses without the need for structural modifications.

Preferably, when the VCS (10) system is configured to receive a gas grill, and the main housing component (12) (comprising frame 18) is associated with a first accessory module (14) and a second accessory module (16) as depicted in FIG. 2, neither the surfaces of the accessory modules that are adjacent to, and mechanically associated with, the left and right portions (28, 30) of the housing frame (18), nor the left and right portions of the housing frame (18) are associated with cladding material to enhance cross venting between the accessory modules and the main housing and to reduce costs.

Adjustable Fire Box

Figure 7:
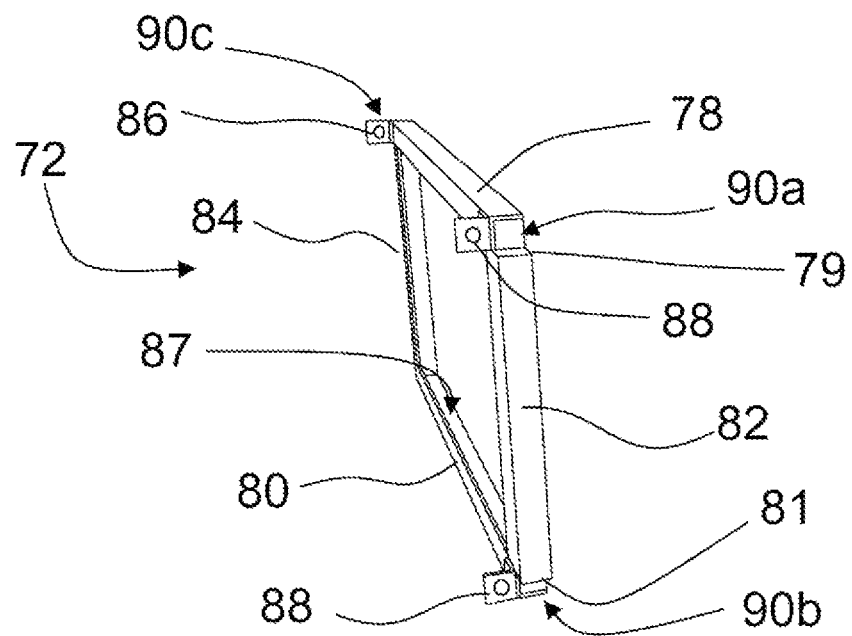
FIG. 7 is a first side perspective view of a first fire box frame.
Figure 8:
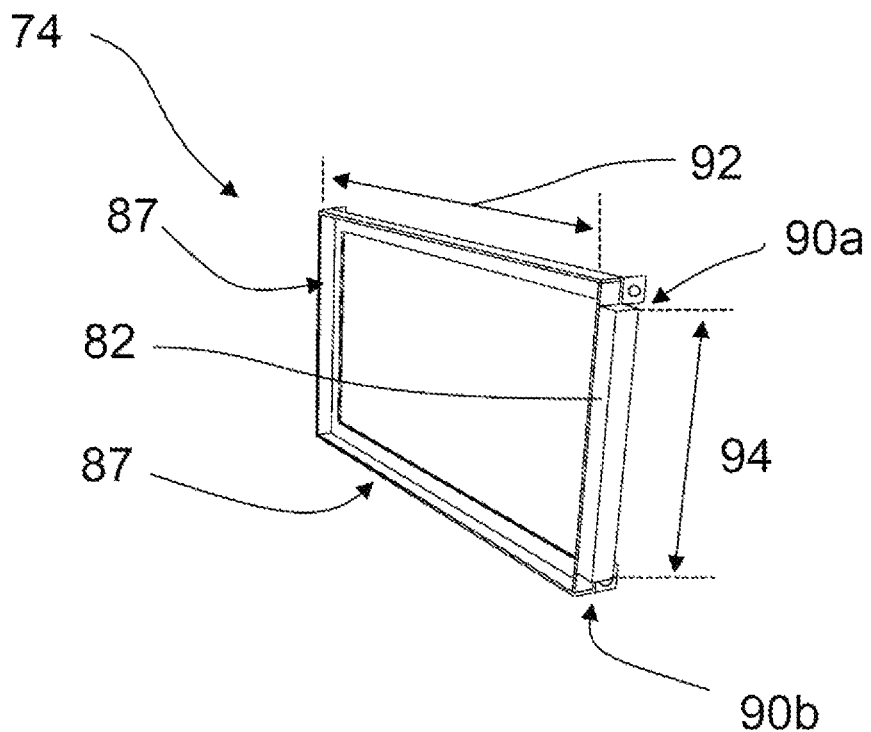
FIG. 8 is a second side perspective view of a second fire box frame.
Figure 9:
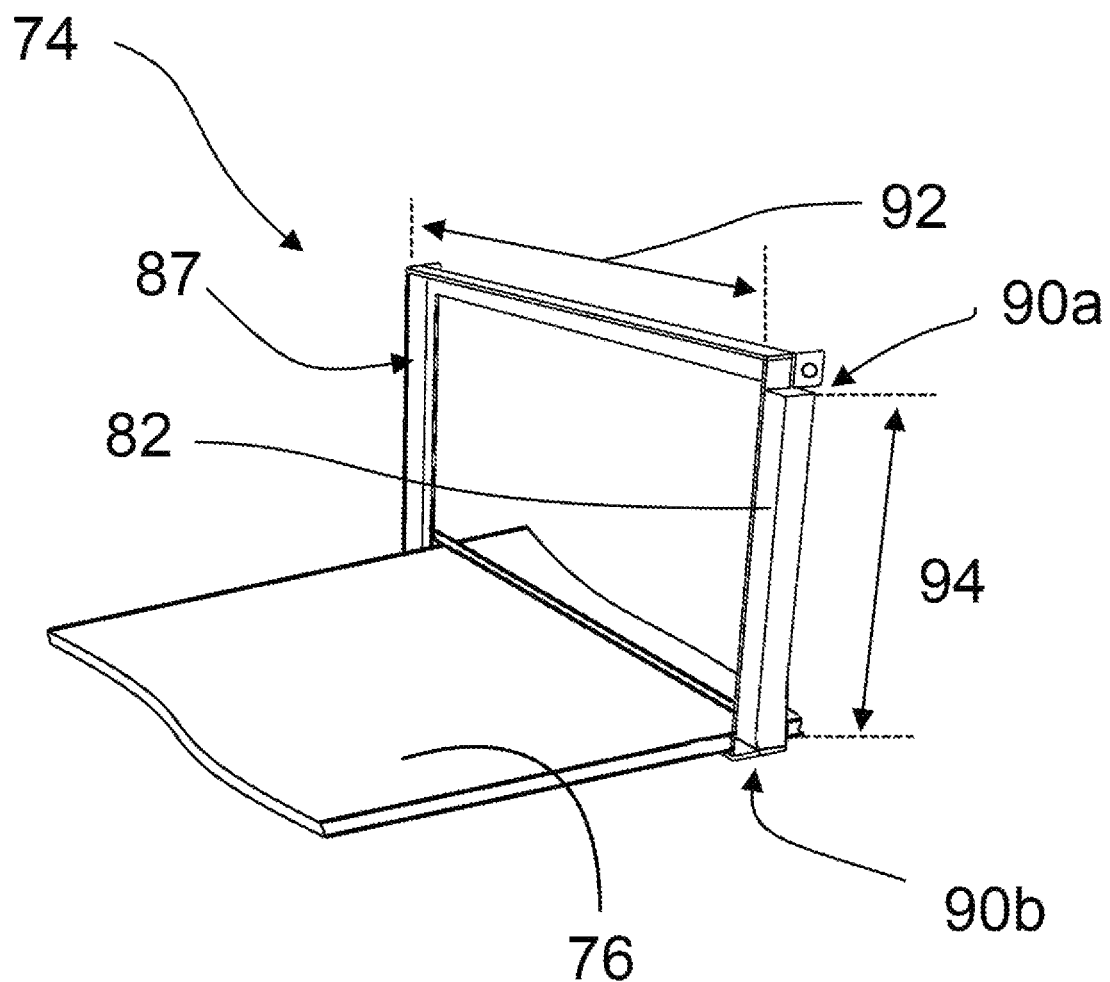
FIG. 9 is an alternative embodiment of the frame of FIG. 8 with a slot configured to receive a fire box element 76.

Referring not to FIG. 5, FIG. 7, and FIG. 8, the main housing component further defines an adjustable fire box void defining an open box element (70) made of noncombustible material and suitable for receiving a grill element for a plurality of grill element sizes. One embodiment of an adjustable firebox (70) comprises a first firebox frame (72, FIG. 7) and a second firebox frame (74, FIG. 8) defining two opposing sides of the adjustable firebox void and configured to at least partially support a grill element (6) wherein the distance between the two frame support elements is selectable to vary the size of said adjustable firebox void. Each firebox frame (72, 74) is configured to receive a plurality of thermal plates (76) to define an open adjustable firebox (70) having a bottom and four sides. Basically, such first and second firebox frame elements each define a frame support element defining two opposing sides of the firebox (70) defining a firebox void and are further configured to at least partially support a grill element (6) wherein the distance between the two firebox frame support elements is selectable to vary the size of the firebox void (to accommodate grill elements of different sizes).

The first firebox frame (72) comprises a top-FB-rail (78), a bottom-FB-rail (80), a front-FB-side-rail (82), and a back-FB-side-rail (84) mechanically associated at their ends to define a rectangular shape where the top-FB-rail (78) is parallel to the bottom-FB-rail (80), and the back-FB-side-rail (84) is parallel to the front-FB-side-rail (82) as depicted in FIG. 7 and FIG. 8. Notably, such a firebox frame could define one integral component or a plurality of components.

The top corner joint (79), where top-FB-rail (78) meets the front-FB-side-rail (82) defines a frame interface (90a). Similarly, the bottom corner joint (81) where the bottom-FB-rail (80) meets the front-FB-side-rail (82) defines frame interface (90b). And the top back corner joint (83), where top-FB-rail (78) meets the back-FB-side-rail (84) defines a frame interface (90c).

The frame interfaces (90a, 90b, 90c) may further define anchor point (86) configured to be mechanically associated with frame (18) using attachment mechanisms such as pins, screws, and bolts. The distance (94, FIG. 8) between frame interface (90a) and frame interface (90b) defines the height of the firebox (70) and is about equal to distance H (FIG. 1) defined by the housing frame (18). Similarly, the distance

(92) defines the depth of the firebox (70) and is about equal to distance D (FIG. 1) between front-top-rail (48) and back-top-rail (52).

One of ordinary skill in the art will appreciate that the above teachings for the first firebox frame (72) apply equally to the second firebox frame (74) and that such a configuration allows the first and second firebox frames to be installed between the front-top-rail (48) and the back-top-rail (52) so that frame interface (90a) is associate with the front-top-rail (48), the frame interface (90b) is associated with front inner rail (64) and interface (90c) is associated with back-top-rail (52) and where the firebox frames form right angles with such frame (18) rails to define framing for the firebox structure (70).

The firebox (70) is "adjustable" as its width is adjustable. More specifically, the first firebox frame (72) and second firebox frame (74) may be moved along the rails of the frame (18) to increase or decrease the distance between such frame components, thereby changing the width of the firebox (70) which would ideally be determined by the size of the grill element (6) or another item to be at least partially disposed inside the firebox (70).

As noted above, the first and second firebox frames (72, 74) each define horizontal and vertical shelves (87) configured to receive the bottom and side thermal plates (76) that define firebox (70), as best seen in FIG. 5. Such shelves (87) could define slots so that the thermal plates (76) can slide along such slots as the width of the firebox is varies, as depicted in FIG. 8B. Alternatively, the plates (76) can be cut to fit the desired width.

It should be appreciated that generally speaking, a heat-shield barrier is designed to shield something from radiant heat. The goal of the thermal plates (76) of the firebox (70) is to provide a heat barrier between an item placed inside the firebox (70) that generates heat and the remainder of the VCS (10) structure. Any suitable material may be used, including concrete boards such as the ones made by Durock®.

Figure 10:
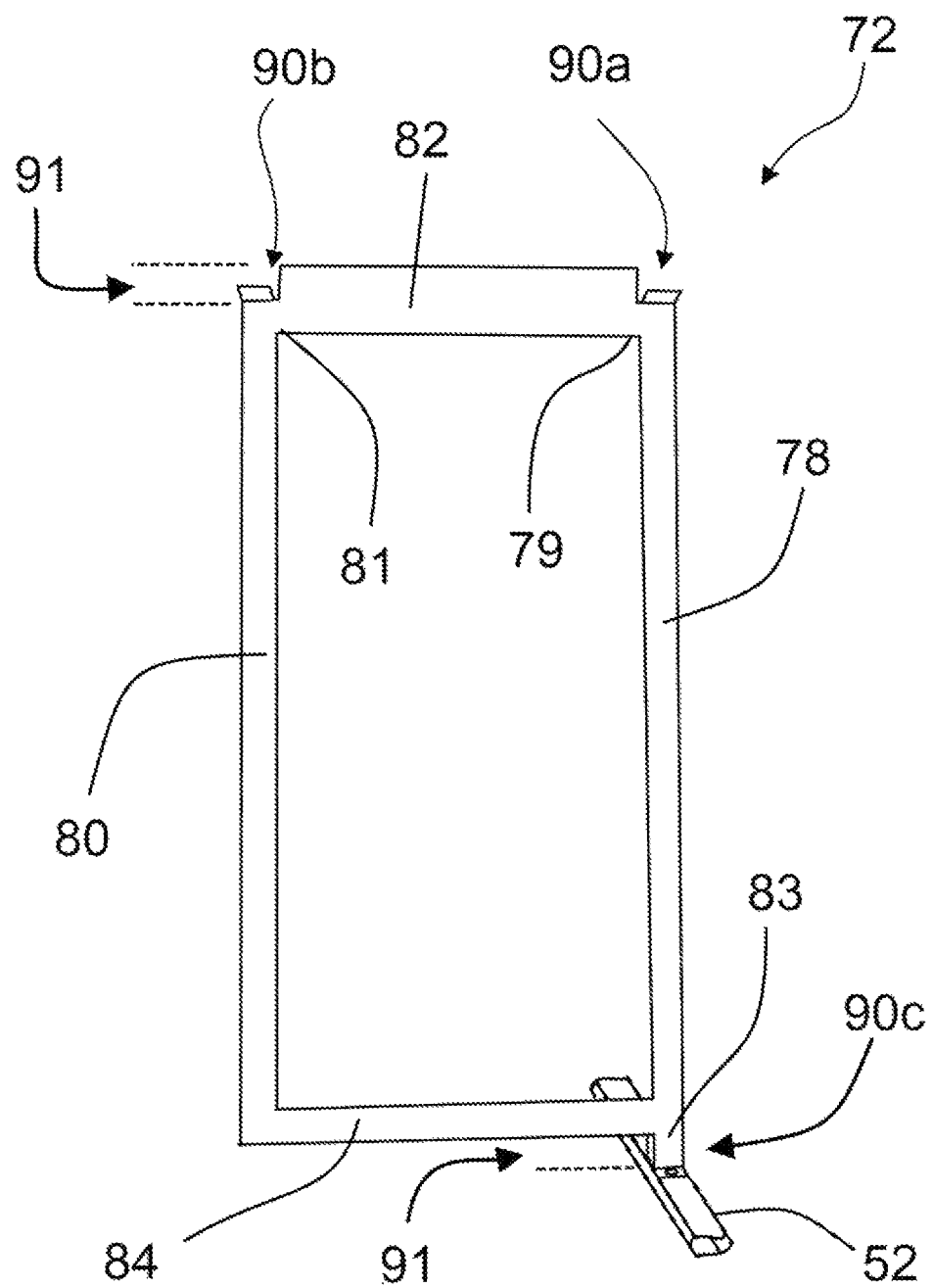
FIG. 10 is a side elevational view of a fire box frame.
Figure 11:
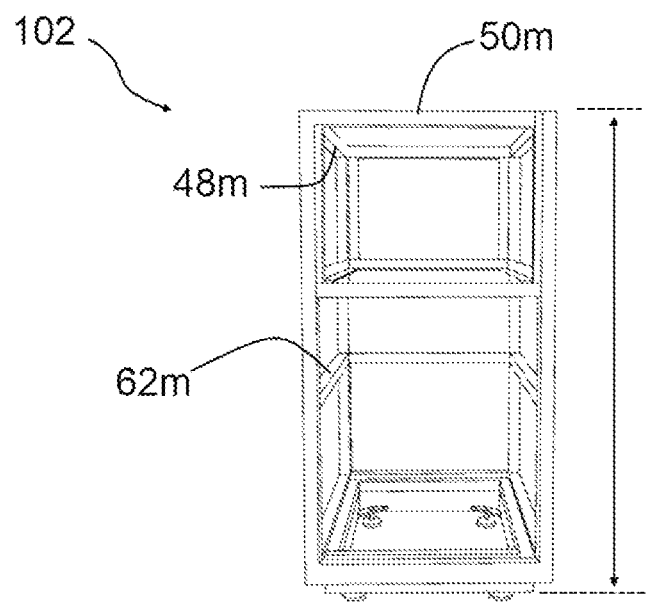
FIG. 11 is a side elevational view of the frame of an exemplary accessory module.
Figure 12:
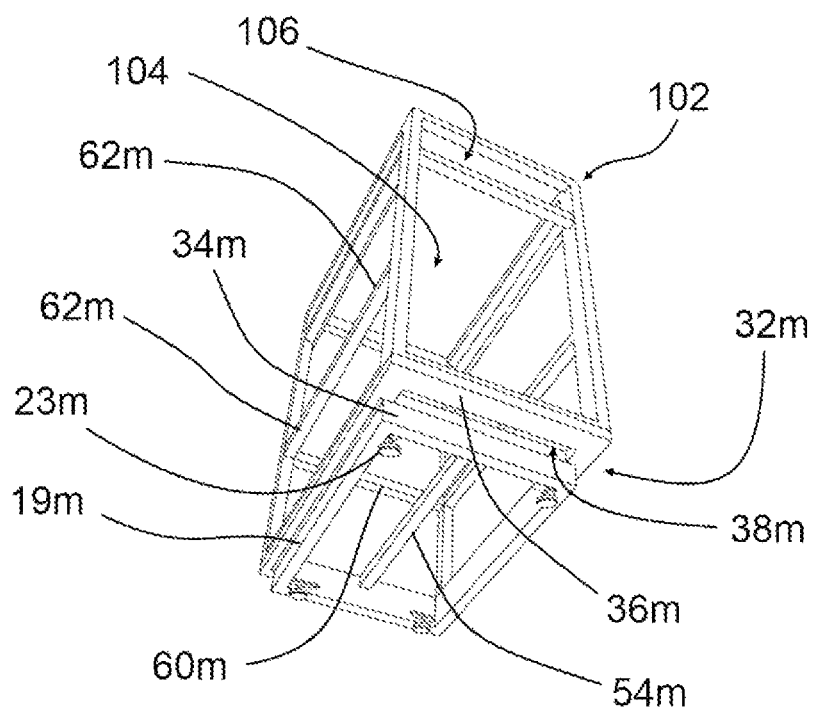
FIG. 12 is a bottom perspective view of the frame in FIG. 11.

As best seen in FIG. 10, adjustable firebox (70) further defines an air gap (91) between the firebox (70) and the front portion (24), and the back portion (26). Such a fire gap (91) enhances the thermal protection of the VCS (10) system.

Toe Space and Venting

National, state, and local regulatory gas laws seem to be constantly changing regarding the venting requirements of gas grill type structures. The disclosed VCS (10) system comprises a venting scheme that includes a bottom front venting-void (38) for venting the front of the system. Similarly, the outer sides of the VCS (10) system provide a venting function as described below. The combination of the "bottom front" venting, side venting, and cross ventilation features make the VCS (10) system universal in addressing applicable regulatory venting requirements.

As best viewed in FIG. 6, the front portion (22) of the main housing (12) preferably defines a toe space area (32) along the lower part of the front portion (22). Toe space area (32) defines a vertical section (34) and a horizontal section (36) (each about 6 inches long, i.e., 6 inches deep and 6 inches high). The toe space area (32) is designed to allow for proper venting using the horizontal section (36) without the need to vent the vertical section (28) as now disclosed. Thus, for one preferred embodiment, horizontal section (36) defines a venting-void (38) configured to releasably receive a venting-element (40) (not shown). FIG. 6 presents a close-up view of an exemplary toe space area (32) configuration showing the vertical section (34) and the horizontal section (36) defining a venting-void (38) not associated with a venting element.

FIG. 4 presents one embodiment of a venting-element (40) removably associated with venting-void (38). It should be appreciated that the venting-element may be integrated with the horizontal section (36) without departing from the scope and spirit of the invention. Notably, by having the horizontal section (36) define the venting-void (38), such venting-void (38) and associated venting-element (40) complies with applicable venting regulations while not being visible during normal use of the CVS (10) system (without opening doors) providing an enhanced visual appearance compared to systems where the bottom vents are visible (i.e., defined by the vertical front surface).

Additionally, selected outer surfaces of the VCS (10) system are also configured to provide a venting function/feature. More specifically, one outer surface of such a right portion (30) and the left portion (28) of the main housing frame (18) may be associated with a cladding material defining a vertically extending vent region. It should be appreciated that we are currently considering the main housing component (12). Notably, where the left and/or right portion of the main housing component (12) are associated with an accessory module, such portion of the main housing is configured with a housing interface (31) configured for being mechanically associated with an accessory module interface (100) and the outer surface (i.e. opposite side) of the accessory module will define the venting-element (41a, FIG. 13).

Figure 13:
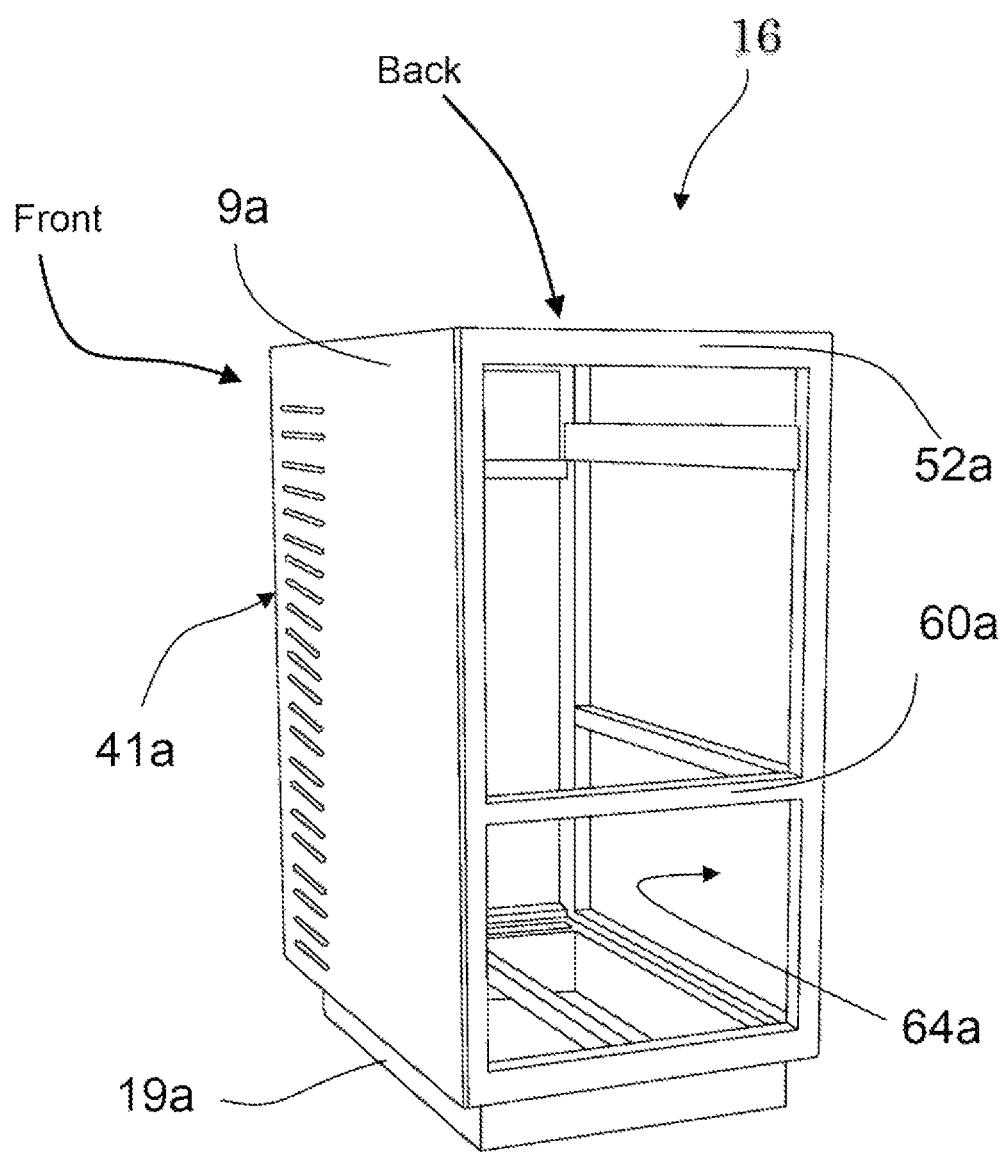
FIG. 13 is a side elevational view of an exemplary accessory module with cladding defining a plurality of vertical venting elements.
Figure 14:
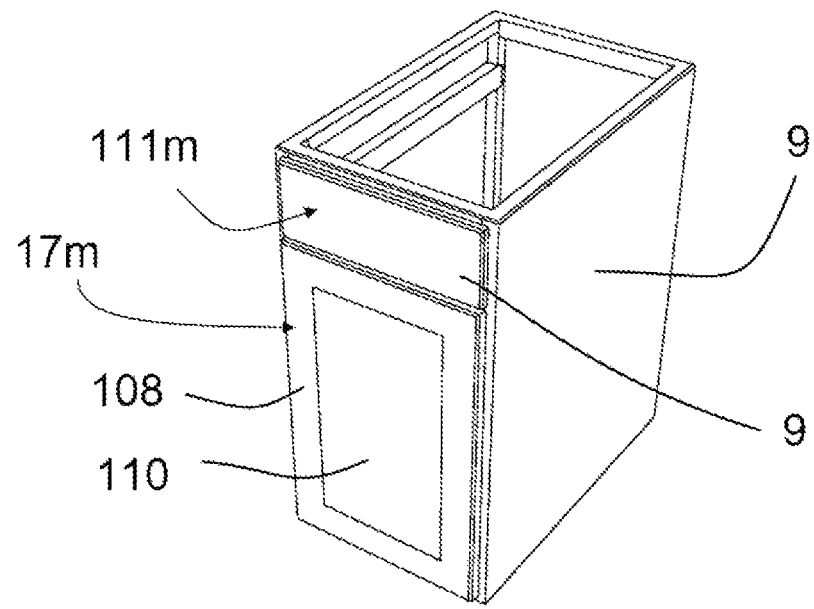
FIG. 14 is an elevated perspective view of the frame in FIG. 11 associated with cladding without vents.
Figure 15:
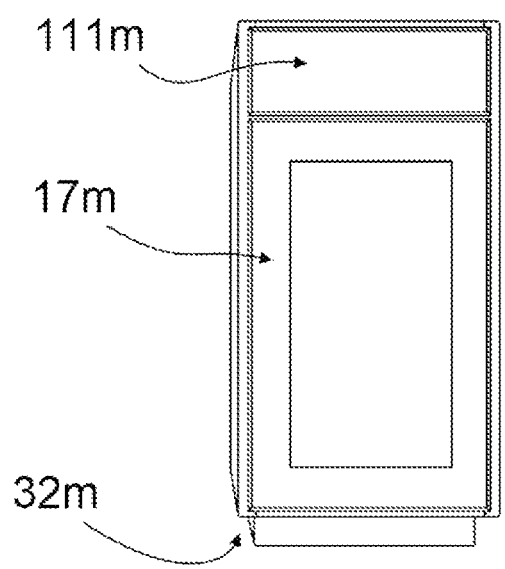
FIG. 15 is a front elevational view of the frame in FIG. 11 associated with cladding.

Preferably, the venting-element (41a) is placed in a position on the side of each accessory module (e.g., front, middle, back, etc.) so that when the system is installed properly, the side and front venting, along with the cross venting (i.e., the "hollow" internal structure—internal walls not cladded), allows for proper airflow complying with a plurality of varying applicable regulatory standards related to venting. As depicted in FIG. 13, the venting-element (41a) is disposed along the front of the side of the the accessory module (16). More often than not, however, it is expected such venting-element (41a) would be disposed along the back of the side of the accessory module (16) to make such venting less visible and provide improved back side venting.

Figure 26:
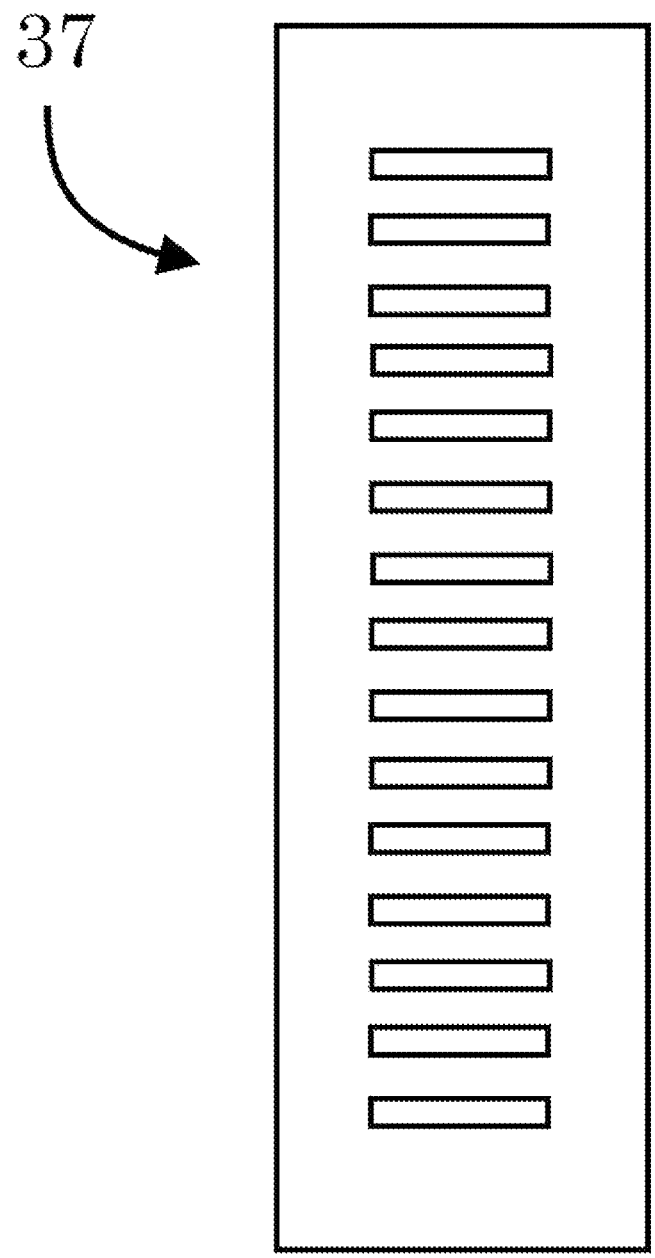
FIG. 26 is a close-up plan view of a vertical venting element.
Figure 27:
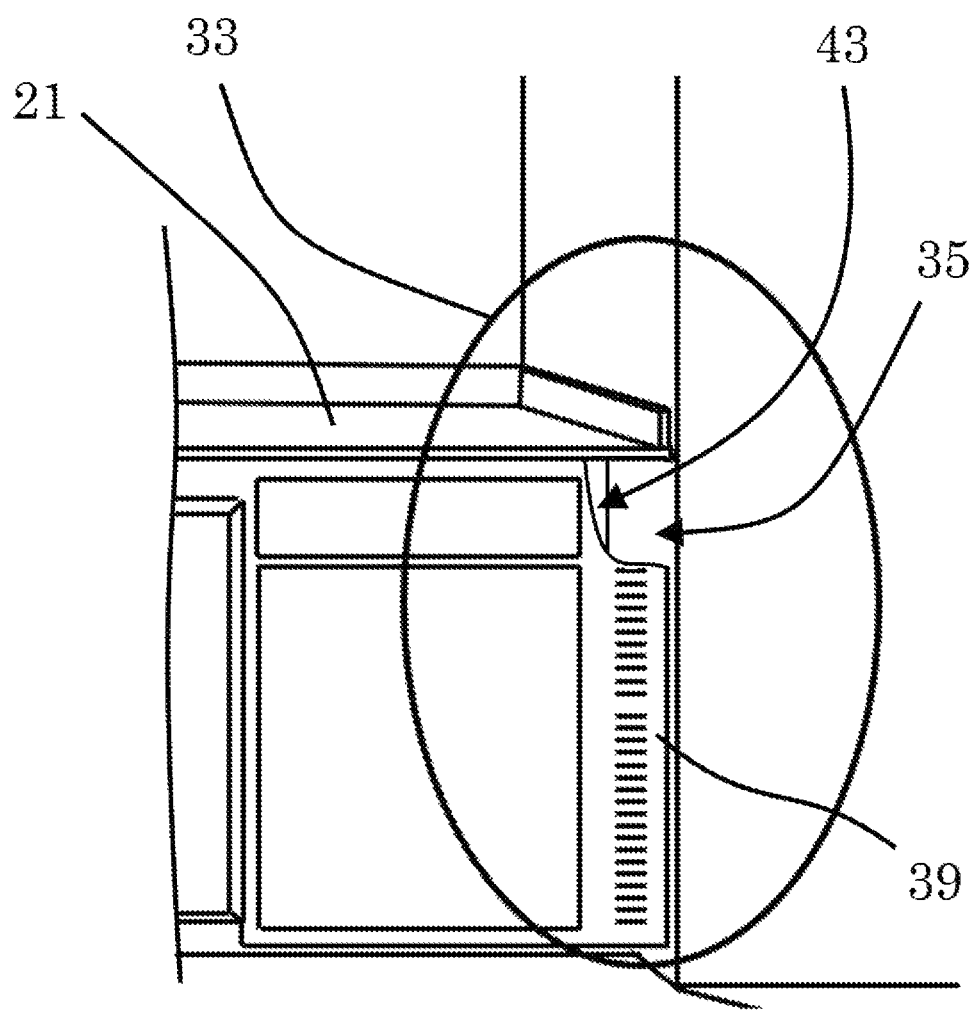
FIG. 27 is a close-up view of a portion of the structure in FIG. 25 with a cut away portion showing the end gap with vertical venting features.

Referring not more particularly to FIGS. 25, 26, and 27, a vertical venting scheme comprising at least one of a vertical venting module (37), a vertical venting feature (39), and a stand-off (35) are considered in more detail. As depicted in FIG. 25, the VCS (10) is installed adjacent to a back wall and two side walls. The VCS (10) comprises a main housing with each side associated with at least one accessory module (14, 16). The front of VCS (10) is associated with cladding material (9), where the cladding (9) on each side of the VCS (10) system either defines a vertical venting feature (37) or is associated with a vertical venting module (39). One exemplary vertical venting module (37) is depicted in FIG. 26. As noted previously, a "vertical venting module" may define a "horizontal venting module" depending on its orientation relative to the support surface supporting the VCS (10) system.

Preferably, the top element (21) associated with the top portion (20) of the frame (18) extends beyond the perimeter of the framing system for the VCS (10) system to create a stand-off (35) between the perimeter side rails (e.g. module side rails 43) and the wall structure so that the vertical venting feature/module (37, 39) is adjacent with the stand-off (35). One of ordinary skill in the art will appreciate that such a configuration provides vertical venting along the sides, horizontal venting along the toe space area with cross ventilation path defined between the accessory modules (14, 16) and the main housing component (12). Such defines a universal venting system as such venting configuration complies with a plurality of venting standards having a plurality of venting requirements.

Accessory Modules

Referring now more particularly to FIG. 11 through FIG. 19, accessory module embodiments are considered in more detail. The accessory modules (14, 16) comprise an accessory frame (102) preferably constructed of the same materials and many same or similar general elements and structure as housing frame (18). For example, the accessory frame (102) defines a toe space area (32m), side-mid-rail (62m), a back-mid-rail (60m), a support-portion (19m) defining support interface. It will be appreciated that accessory rail components that are similar to a main housing frame component use the same number tag with an "m" following the number to signify the component referred to as an accessory Module component. For the preferred embodiment, the similar components align with their main housing counterpart. For example, the accessory module toe space area (32m) aligns with the main housing component frame (18) toe space area (32). Similarly, the frame (18) side-mid-rail (62) aligns with the accessory module side-mid-rail (62m) when the accessory module is associated with frame (18) as depicted in FIG. 3 and FIG. 4.

Figure 16:
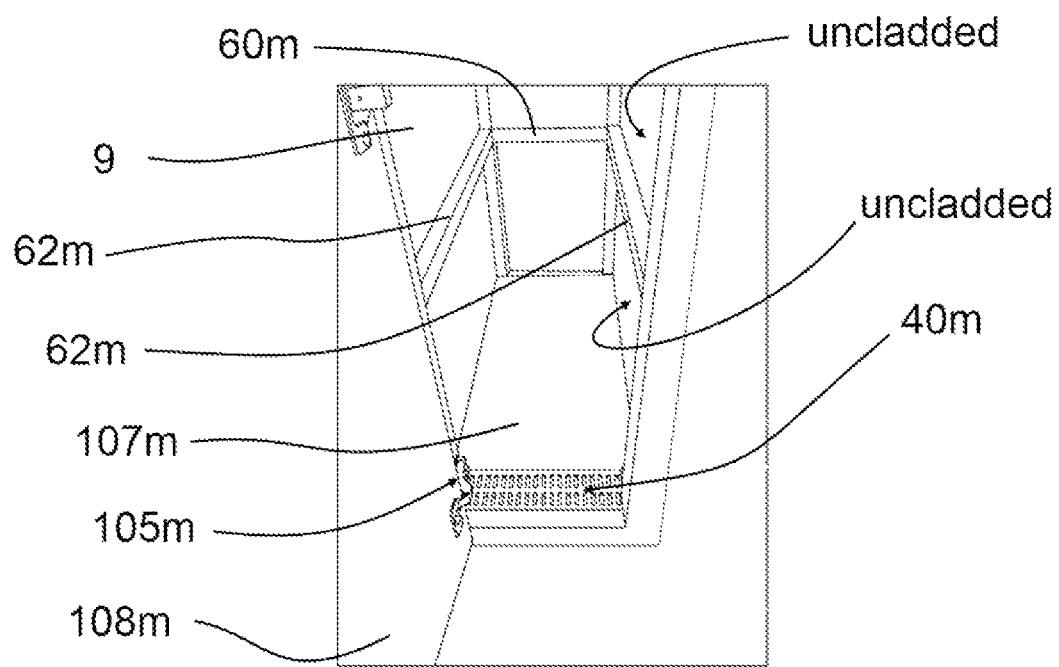
FIG. 16 is a partial front perspective view of the accessory module depicted in FIG. 14 with the drawer element open showing the inside void configured to provide cross venting.
Figure 17:
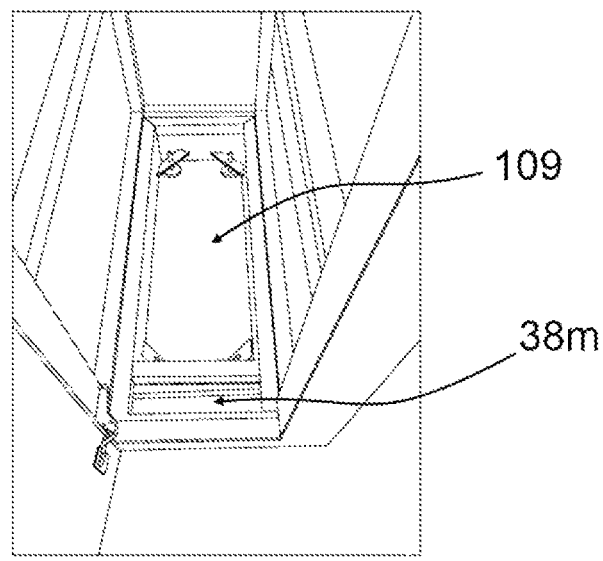
FIG. 17 is a partial front perspective view of the accessory module depicted in FIG. 14 with the drawer element open showing the inside void with the bottom plate and venting element removed.

Similarly, as with main housing (12), the accessory module toe space area (32m) is defined along the lower part of the front portion (22). As before, the accessory module toe space area (32m) defines a vertical section (34m) and a horizontal section (36m) (each about 6 inches long, i.e., 6 inches deep and 6 inches high). The toe space area (32m) is designed to allow for proper venting using the horizontal section (36m) without the need to vent the vertical section (34m). Thus, for one preferred embodiment, the horizontal section (36m) defines a venting-void (38m) configured to releasably receive a venting-element (40m). FIG. 16 presents a close-up view of an exemplary toe space area (32) associated with a removable venting-element (40m) and a removable floor element (107m) while FIG. 17 shows the venting-element and floor element removed.

That said, the configuration of the accessory frame (102) will depend on the function of the accessory module. The width of the accessory module and associated frame can vary from standard sizes of 12, 18, and 24 inches, with the height, preferably being equal to the height of the housing frame (18) (to provide for the previously described flat surface across the top of the housing frame (18) and the accessory modules (14, 16). Such height is preferably about thirty-three and one-half inches from the support surface to the top of the frame surface.

Door and Drawer Elements

As with the main housing and as best viewed in FIG. 12 through FIG. 17, the outer surfaces of the frame for the accessory modules (14, 16) are configured to receive cladding material (9). Further, a door element (17m) is movably associated with the module frame to provide access to a void defined by the accessory module (see FIG. 4). Similarly, a drawer element (15m) or drawer blank (111m) is associated with the upper part of the module frame.

Figure 20:
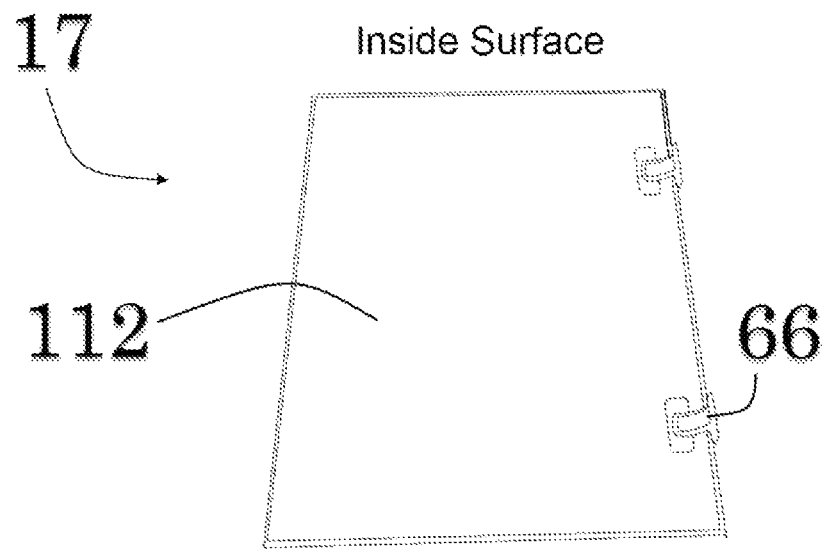
FIG. 20 is a perspective view of the back side of a door element.
Figure 21:
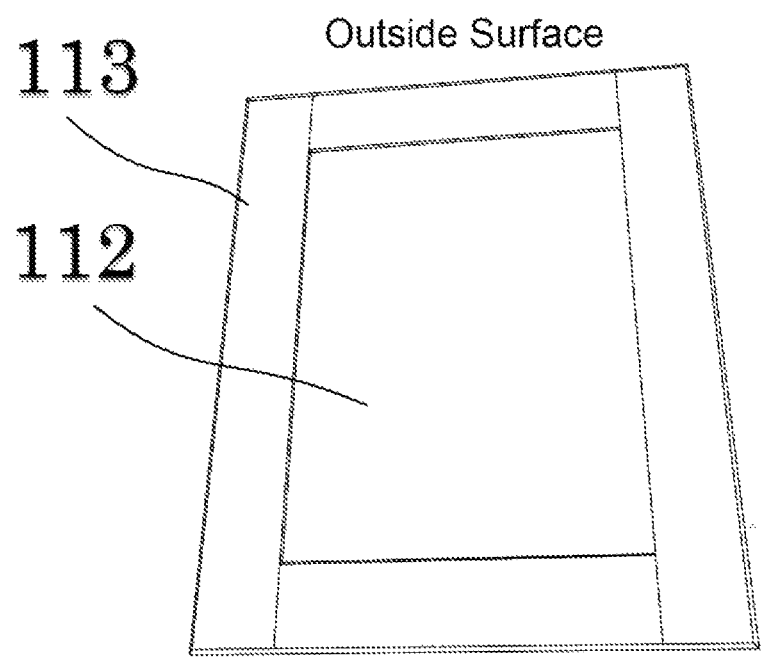
FIG. 21 is a perspective view of the front side of a door element.

The door elements (17m) and (17, for main housing) are preferably constructed using the same materials and methods as previously described. Small components, such as the door elements, are particularly troublesome when it comes to durability and function. Such components are susceptible to damage from abuse, warping, and decay from the passage of time. Further, the goal is for such components need to be easily maintained and cleaned to keep the system looking as new as possible. As best seen in FIG. 20 and FIG. 21, to achieve such goals, the door elements are constructed from a first door base material (112) for the door body and a second door material (113) for aesthetics and strength.

Still referring to FIGS. 20 and 21, one exemplary door element is depicted comprising a first door base material (112) composed of a material such a polyvinyl chloride (PVC) with a thickness of between one-quarter inch to one inch (preferably one-half inch). PVC provides a very strong and durable door that is impervious to insects as is less expensive than a second door material (113). Unfortunately, PVC will warp over time. To address such a problem, a second door material (113) is mechanically associated with the outer perimeter of the outside surface of the door. The "outside surface" of a door is the surface that is normally seen when the door is closed. Such second door material (113) preferably further adds an aesthetically pleasing feature to the door element (17). Thus, for the preferred embodiment, the second door material (113) is the same material that defines the cladding (9) and is preferably a fiberglass material between one-eighth to one-fourth inches thick. One of the ordinary skill in the art will appreciate that such a fiberglass material will be very resistant to warping and will minimize or eliminate warping of the less expensive PVC material, thereby defining a strong, cost-effective combination.

The door blank (111) would be constructed using a method similar to the door except for the enter outside surface is associated with the second door material (113) (not just the perimeter). The same would be true for the front of a door element (17).

Door Insert

Figure 22:
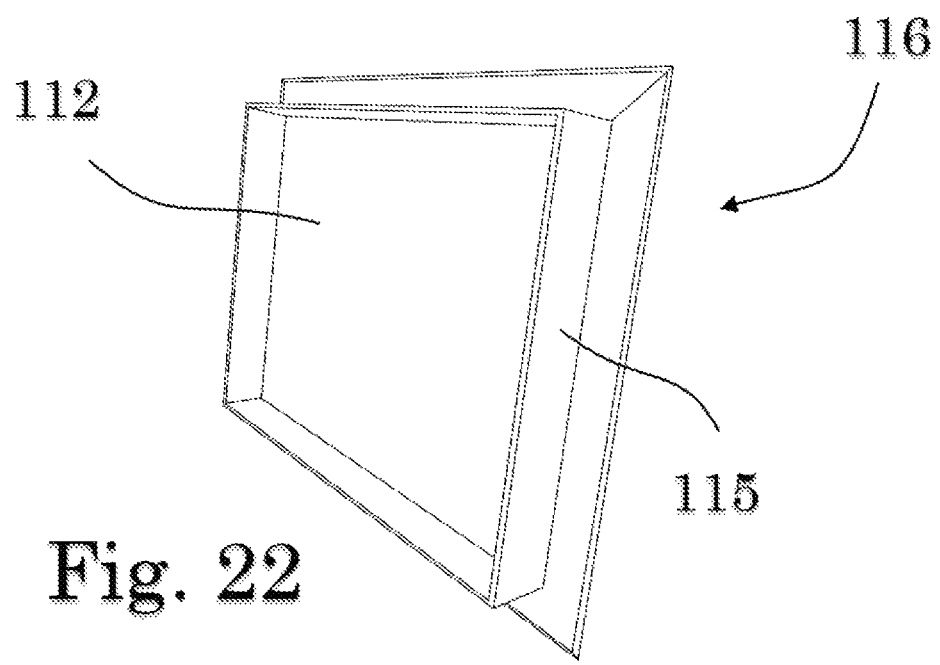
FIG. 22 is a perspective view of the back side of a door module.
Figure 23:
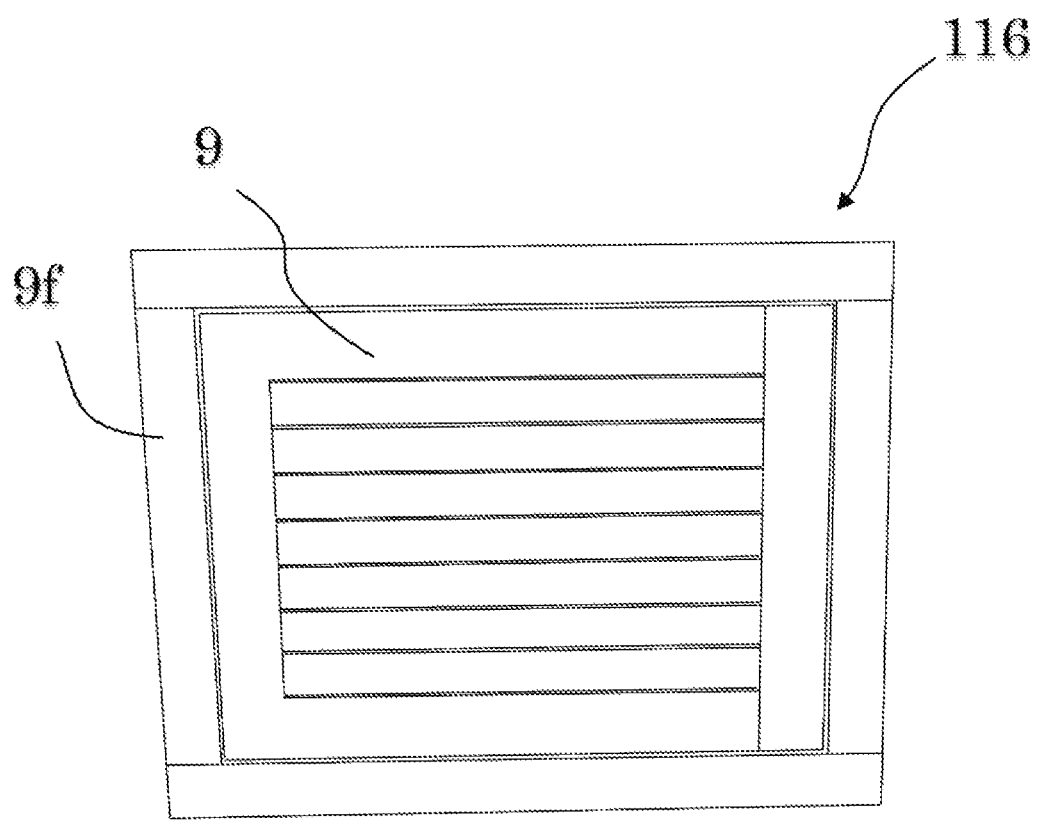
FIG. 23 is a front elevational view of the front side of a door module.
Figure 24:
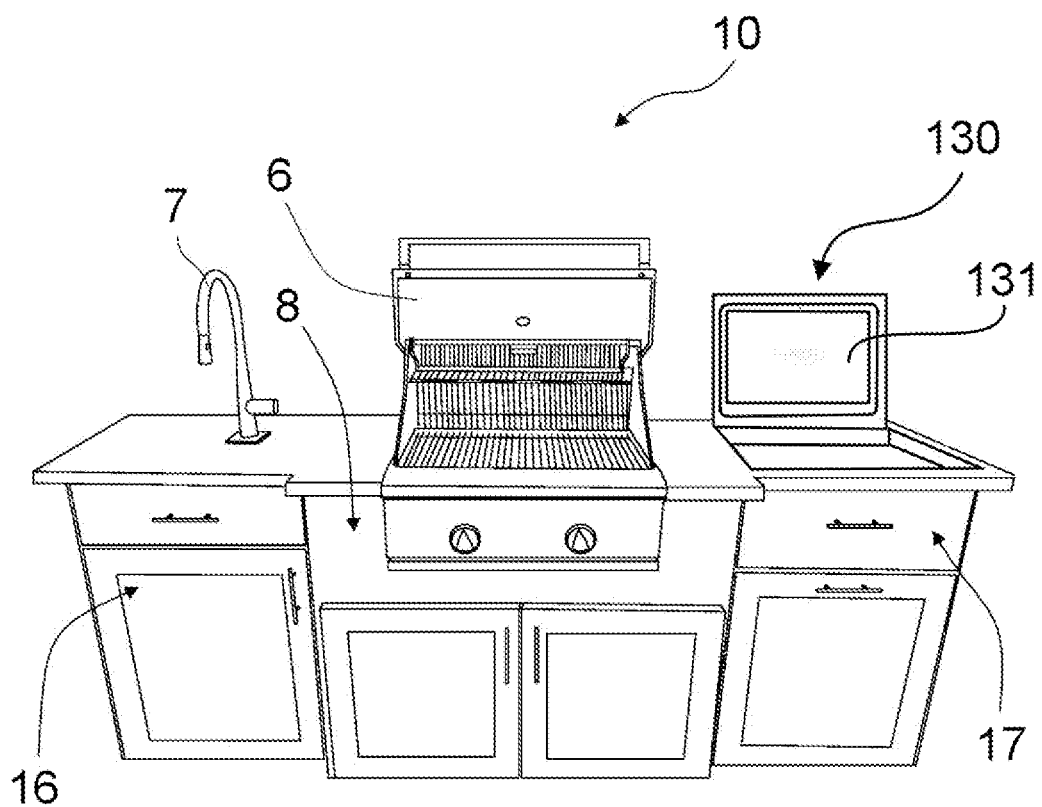
FIG. 24 is a front perspective view of one exemplary embodiment of a configurable cross vented structure associated with an electronic module accessory.

Referring now more particularly to FIG. 22 and FIG. 23, a door module (116) is presented. Please note that we were considering a door element (17, 17m) above. Here we consider a door module (116) which includes the door element (17, 17m) plus a door frame (115). The door frame (115) addresses a different set of challenges compared to the first door base material and second door material requiring a third door material. Notably, the door frame (115) is to be mechanically associated with a support structure such as the main housing (12) frame (18). Consequently, door frame (115) material that is likely most compatible with frame (18) is the same material used for frame (18), which was previously described as structural welded aluminum (or a material with an oxidation state of around 3+ or better). Thus, the door module (116) is constructed from three materials: (a) The door frame (115) is welded aluminum (or an integral aluminum piece); (b) the door body is constructed from a first door base material (e.g., PVC) as described above; and (c) at least the perimeter of the first door base material is mechanically associated with a second door material (fiberglass/cladding). Similarly, the face (9f) of the door frame is associated with the second door material for aesthetic value.

It will be appreciated that for the embodiment depicted in FIG. 23, the entire outside surface of the door body is associated with the second door material (fiberglass) to create a louvered door look.

The frame (115) is suitably sized and defines attachment interfaces so that it can be inserted into and mechanically associated with a standard opening defined by a support structure (e.g., frame (18) or a wall, etc.). The door element (17) is movably associated with the door frame (115) so that the door element can be opened and closed. For one embodiment, a "pin" system is used where the pin is constructed from aluminum.

Cladding

As noted above, a cladding material is mechanically associated with the selective outer surface(s) of the frame (18) and any associated accessory modules. For the preferred embodiment, the cladding material (9) is associated with the frame (18) using a waterproof all-weather glue. The preferred cladding material (9) comprises very durable weather and insect-proof one-fourth inch thick fiberglass material with the look and feel of real wood. Such cladding material (9) provides high resistance to denting, chipping with no material warping ("material" simply means no warping that becomes an issue) during the life of the product. Such cladding material (9) is paintable using high-quality exterior paint and/or a color/die added to the material when manufactured to provide for a natural paint-free color.

For the embodiment depicted in FIG. 3, cladding material (9) is one-quarter inch fiberglass and is associated with at least part of the front of the main housing component (12), first accessory module (14), and second accessory module (16) of the VCS (10) system. The cladding material is further associated with the outer side surface of first accessory module (14) and the second accessory module (16), with at least one cladding surface defining a plurality of vertically aligned venting elements as previously described.

As noted above, for some installations, one or more surfaces of the main housing component (12) and first and second accessory modules (14, 16) may not be "outer surfaces" as they may be mechanically associated with, or placed adjacent to, a vertical surface/structure (such as a wall, or a system component) (FIG. 25). The back portion of the VCS (10) system (as well as the back portions of any associated accessory modules), for example, is the most likely portion to be installed adjacent to a wall-type structure. Consequently, cladding material (9) may or may not be mechanically associated with the outer surface of the back portion (26), depending on the installation environment and the owner's desires.

Similarly, the side portions of main housing component (12) are most likely to be associated with an accessory module. Where an accessory module meets another component, such as the side of the main housing module (12), for the preferred embodiment, the surface where the two components meet are considered "internal" surfaces and are not associated with cladding material. Such a configuration reduces costs and improves ventilation.

All that said, for the preferred embodiment, the outer surfaces of the side portions and back portion are configured to provide a generally flat surface suitable for being mechanically associated with a cladding material (9) even when cladding is not to be associated with such surface.

Front Offset

Referring now back to FIG. 2 and FIG. 3, as noted previously noted, two slightly different configurations are presented. As depicted in FIG. 2, some users desire an "front offset" (13) configuration where the front of the main housing component (12) extends beyond the front of the first accessory module (14) and the second accessory module (16). FIG. 3 shows a second configuration where the front of the main component is in alignment with the accessory modules. For the preferred embodiment, the main module is configured to mechanically associate with accessory modules in either configuration when with no structural modifications. Such a feature is achieved at least in part using the "module interface" discussed below.

Module Interface

Figure 18:
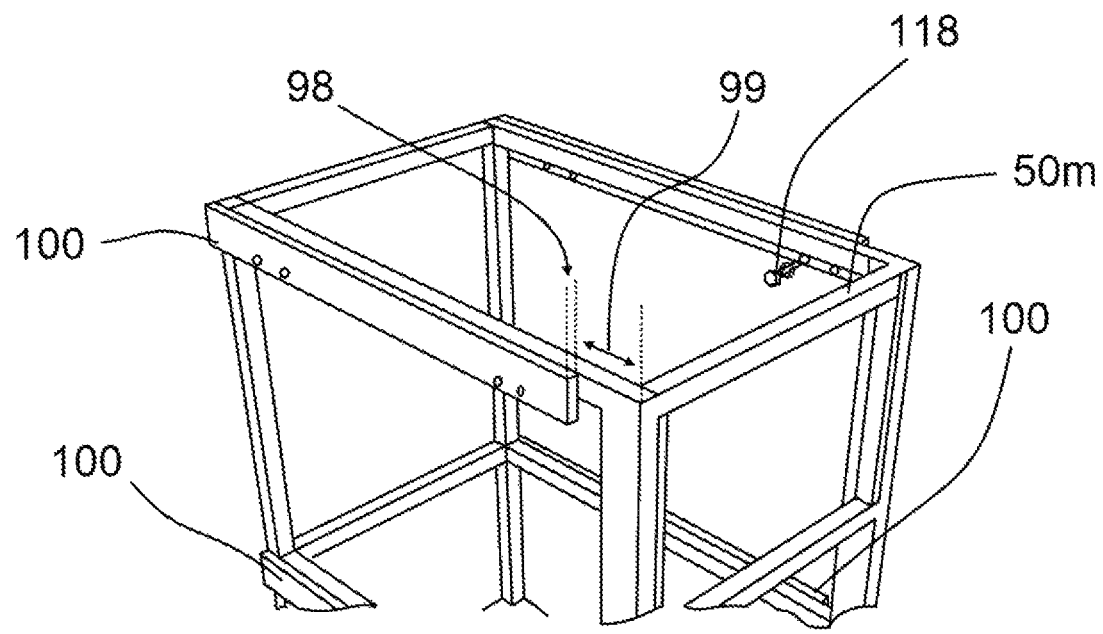
FIG. 18 is a side perspective view of an accessory module frame associated with a module interface.
Figure 19:
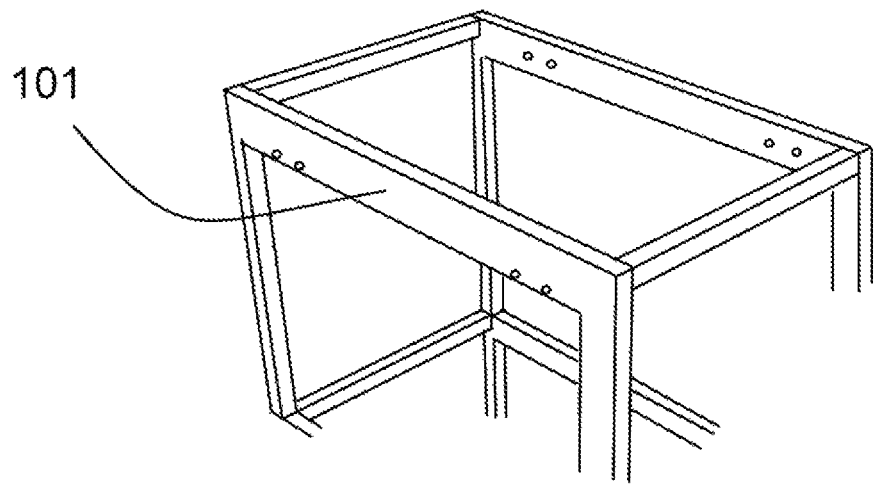
FIG. 19 is a side perspective view of an accessory module frame with an integral module interface.

Attention is now directed more particularly to FIG. 18 and FIG. 19, which depict embodiments of a module interface (100) configured to releasably mechanically associate an accessory module structure with frame (18) of the main housing component (12). Two embodiments are presented (a) an integrated version where an integrated module interface (101, FIG. 19) is defined by the frame (18, 18m) rails; and (b) module interface (100, FIG. 18) where the module interface is mechanically associated with the frame rails. More specifically, for the embodiment where option (b) is used, a module interface (100) is mechanically associated with the side-mid-rail (62), and top side rail (48) of the frame (18) and the corresponding rails of the accessory modules (14, 16). As best seen in FIG. 18, such provides for a space to receive an attachment element (118) that will prevent the attachment element (118) from interfering with a drawer element (for example) that needs to slide in and out of the accessory module. Modules without sliding elements could use the integrated module interface (101). The module interface (100) is placed at a back offset distance (99) from the front top rail (50m) an offset distance (99) which is equal to the offset (13) distance of FIG. 2.

It will be further appreciated that the above configuration provides for the offset/no offset embodiments and for associating accessory modules that has sliding doors and no sliding doors, which makes the framing method "universal" for the purposes of this document.

More particularly, the above framing system creates a universal vented, configurable structure for housing a grill element comprising a right side module structure and a left side module structure wherein said right portion and said left portion are each configured with a module interface configured for mechanically associating the modules to the main housing (12) frame (18) where the rear of each module structure is in alignment with said back portion of the main housing (for no offset) so that said cladding can be associated with the outer surfaces of the composite frame. For the offset version, there will be a "gap" along the back of the main housing (12), but such a gap will be covered (hidden) by the top element (21).

Electronic Module

Attention is now directed to the embodiments of the invention related to electronic features, including monitoring.

Figure 28:
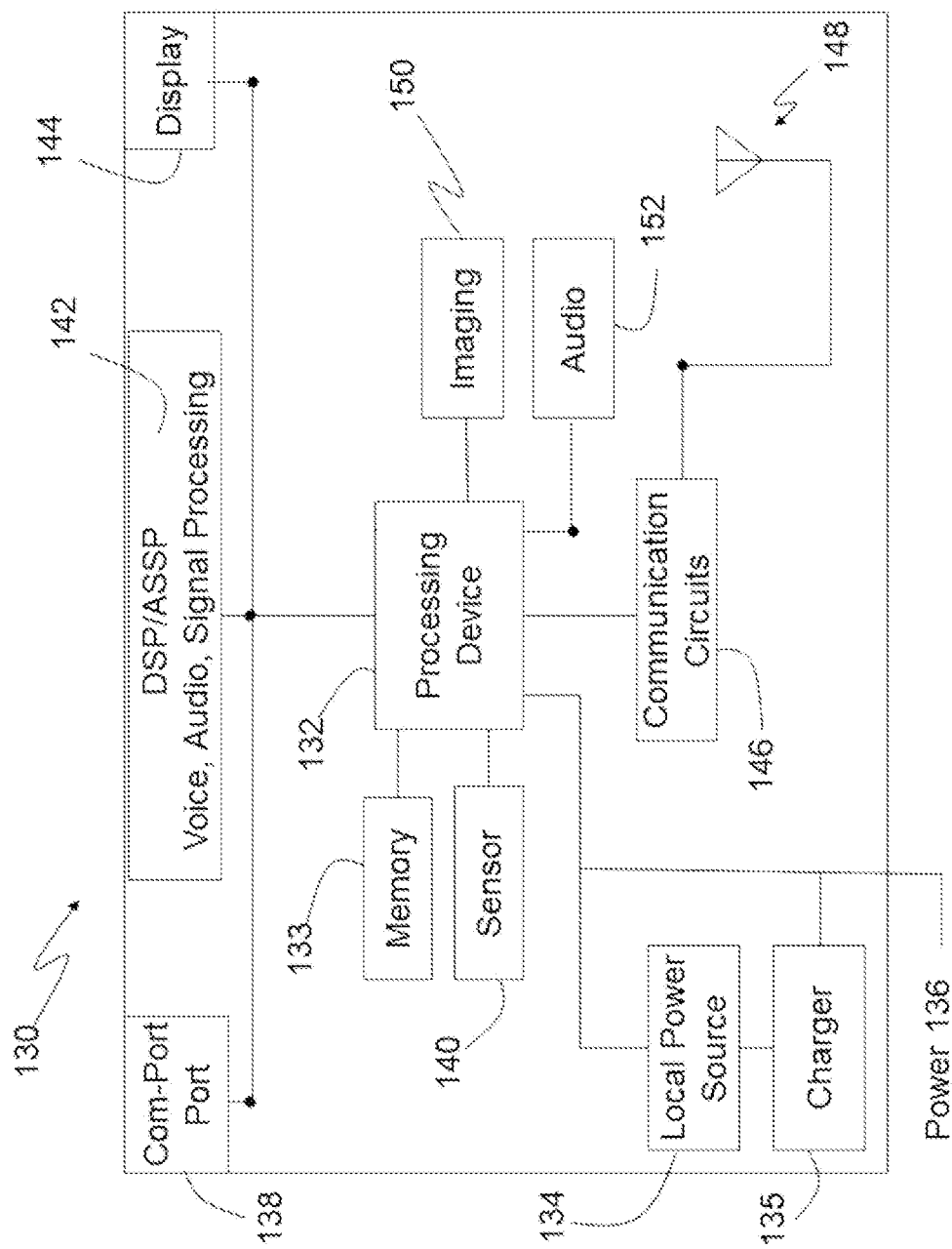
FIG. 28 is a block diagram representation of the hardware for an electronic module and associated sensors.

Referring now to FIG. 28, a storage cabinet Electronic Module (EM) (130) and associated electronic devices are considered. The EM (130) preferably comprises a touch screen (131) and is configured to communicate with remote devices, such as telephones, via a wired or wireless communication connection. The EM (130) may be a general-purpose computer (such as a tablet) programmed with "apps" (applications) and software to create a specific purpose computer. Alternatively, EM (130) may be a module specifically designed to provide the desired services and can be equally used with VCS (10) systems.

The EM (130) module comprises a processing device (132) electrically associated with at least one of a local power source (134) and external power source (136). Embodiments of an external power source include a 120 AC volt power source supplied by a typical utility grid/company. Such an external power source (136) may be used to charge the local power source (132) as well as supply power to EM (130).

The EM (130) may further comprise a communication port (138) configured for allowing communication between EM (130) and external devices. Communication port (Com-Port) (138) may define any number of ports, and not all ports need to use the same communication hardware or software. One use of a Com-Port (138) would be to connect an external device or sensor to EM (130) as described below.

A sensor array (140) comprising at least one sensor is further electrically associated with the processing device (132). Such a sensor array may include one sensor or a plurality of sensors and may be configured to monitor any number of predefined environment parameters such as temperature, humidity, motion, sound, smoke, CO2 level, and the presence of a gas such as propane (LP gas). The module may further monitor various physiological parameters of a living entity such as a human baby. Such physiological parameters include sensors that read heart rate and heart rate change, blood pressure, body temperature, body movement, and muscle activity. Depending on the parameters being monitored/measured, the sensor may be disposed inside the EM (130) or outside the EM (130) and wired or wirelessly connected to the processing (132). For example, a body-module may be associated with a body to be monitored, and such body-module would be in wired and/or wireless communication (Bluetooth or any suitable communication method) with EM (130). Should the EM (130) note changes in a monitored physiological a waring would preferably be transmitted to the body-module or some other communication device associated with the body being monitored or a remote monitoring service. One example would be physiological changes that may indicate gas poisoning or cardiac distress, which may be connected to some environmental condition being affected by the VCS (10) system.

It should be appreciated that the functions represented by individual module components may be performed by ASSPs (Application Specific Standard Product) although one or more components may be integrated into ASSP chip sets. Manufacturers of such devices include Motorola and Texas Instruments. In addition, Complex Programmable Logic Devices (CPLD) may be used to interface the various ASSP components to a system buss allowing one system component to interface with another component. Manufactures of suitable CPLD devices include Lattice's (ispMACH 4000 family) and (Altera's MAX 7000-series CPLD).

The Processing device (132) may be a microprocessor that supports standard operating systems and application software, although other processing devices may be used, such as ASICs (application-specific integrated circuit) or ASSPs (application-specific standard product). The processing device may comprise onboard ROM, RAM, EPROM type memories (133) for storing data and/or program code such as firmware.

For one embodiment, a DSP/ASSP (142) is electrically associated with the processing device and is preferably configured to perform signal processing tasks such as voice, audio, video, encoding, decoding as well as other data and signal processing functions.

The EM (130) may further comprise or be associated with a display (144) that is electrically associated with the processing device (602). The display (612) is configured for displaying the various user-settable parameters and other information. For the preferred embodiment, the display is an LCD display configured with a touch screen functionally. A graphics accelerator may be used by the processing device that provides support for megapixel cameras and 3D graphics applications. One suitable graphics accelerator is manufactured by MediaQ.

The EM (130) further comprises communication circuitry (148) (such as a transmitter or transceiver), electrically associated with an antenna (148), and the processing device (132). The communications circuitry (146) is configured to transmit a data signal to a remote electronic device. It should be noted that embodiments where the communication circuitry comprises only a transmitter fall within the scope of the invention. For one preferred embodiment, the communication circuitry consumes relatively low power and is configured to communicate with an external device that is expected to be within the range of a low power transmitter signal. For example, for one embodiment, the EM is associated with home monitoring (e.g., security) or WiFi system. Because such a system is expected to be within close communication range of the EM, the EM transmitter(s) can be relatively low-powered, thereby saving energy. That said, device modules with more powerful transmitters may be used, including well-known technologies for wireless communications such as GPRS, GSM, GPRS, 3G, and EDGE enabled networks as well as WAP networks. Consequently, for some embodiments, the communication circuitry may define common cell phone communication technology.

Some embodiments may include both a low-power transmitter and a high-power transmitter. For low power transceivers (a low power transmitter relative to the above described "high power" communication circuitry), such transceivers may operate in any number of unlicensed bands, although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as cell phones and may further be operable to transmit on one or more FM bands to provide communication through an FM radio.

The EM (130) preferably comprises a main power input configured for being associated with an external power source (136), such as typical residential AC power (e.g., 120 Vac). As described above, the EM (130) may include an internal power source (134) that is used when no power is being supplied at the main power input (136). Charger (135) may use external power (135) or be a "green system" such as a photovoltaic or RF scavenging system.

The EM (130) may further comprise an imaging element (150) that is electrically associated with the processing device (132) and configured to acquire image data that may be transmitted to a remote device by the processing device using one of the communication means. For the preferred embodiment, an imaging interface is configured to support CMOS image input sensors such as the one manufactured by Micron® and/or CCD (charge-coupled device) image input sensors such as the ones manufactured by ATMEL® sensors. Such Imaging interface performs the necessary processing functions to convert the imaging data into a desired format before transferring such data to other devices associated with the buss. Such imaging element (150) would be especially useful when coupled with security and remote monitoring systems.

For one embodiment, the EM (130) further comprises an Audio module (152) comprising a speaker and a microphone that is electrically associated with an audio codex. The audio module is configured for detecting sound waves using the microphone and converting such waves into digital data of a predefined format such as MP3. Conversely, the EM (130) device may use the audio module to generate sound waves to play music/sound or to facilitate communications.

One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly. For example, if a first device accesses a file or data from a second device, the access may involve one or more intermediary devices, proxies, and the like. The actual file or data may move between the components, or one device may provide a pointer or metafile that the other device uses to access the actual data from a still further device.

The various computer systems discussed herein are not limited to any particular hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter, as well. For instance, one or more computing devices may be adapted to provide desired functionality by accessing logic or software instructions rendered in a computer-readable form. When software is used, any suitable programming, scripting, or another type of language or combinations of languages may be used to implement the teachings contained herein. However, software need not be used exclusively or at all. For example, some embodiments of the systems and methods set forth herein may also be implemented by hard-wired logic or other circuitry, including but not limited to application-specific circuits. Of course, combinations of computer-executed software and hard-wired logic or other circuitry may be suitable, as well.

Embodiments of the systems and methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions, which, when executed by at least one computer, cause the computer(s) to implement one or more embodiments of the methods of the present subject matter. Additionally or alternately, the computing device(s) may comprise circuitry that renders the device(s) operative to implement one or more of the methods of the present subject matter. Furthermore, components of the presently-disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

Sensor Array

The sensor array (140) is electrically associated with the processor (132) and preferably performs a plurality of safety functions as well as imaging and audio functions as described above as well as include any number of environmental.

A sensor interface may or may not be used. Generally speaking, a sensor is a device that tells something about its environment, typically using a transducer that converts a parameter at a test point to a form suitable for measurement by a sensor circuit. Stated another way, a sensor is a device that is designed to produce a signal or offer an indication in response to an event or stimulus within its detection zone. An electronic sensor is a sensor that provides such information by creating an electrical signal. Such electrical signals are directed to the processing device (132) for evaluation and/or forwarding to other devices. Sensor technologies are known and understood by those skilled in the art, and a detailed explanation thereof is not necessary for purposes of describing the method and system according to the present invention.

A sensor array may include sensors for: (a) carbon monoxide, (b) smoke, (c) temperature (inside and/or outside), (d) outside wind speed, (e) light, (f) sound, (g) door open/closed, (h) lights on/off sensor, (i) power supply status sensor, and (j) movement. If a sensor interface is used, it is preferably a complex programmable logic device (CPLD), or similar device configured to periodically scan (at random intervals, periodic intervals, or user-defined intervals) the various sensors electrically associated with the interface and transfer processed or unprocessed sensor signals to devices such as the processing device (132).

Electronic Module Functions

The above electronic module hardware configuration is not particularly new; however, the use of such a module as programmed (through external programs via a network such as an internet or local applications (apps)) below are novel.

First, the EM (130) can be used to monitor the time and the heat level generated by the grill element (6). For such configuration, heat sensors are associated with grill elements (6), and electronic valves are associated with an energy source such as an LP tank. A recipe for cooking a steak, for example, may-be accessed on the Internet, which gives a time and heat level for the desired level "cook level" (e.g., Well, medium, rare, etc.). The user simply places the meat on the grill element (6) and activates the EM (130) to automatically cook the stake.

Second, the energy level present in the energy source can be monitored. Such is particularly useful with the grill element (6) is an LP gas grill. When the LP gas level in the tank associated with grill element (6) drops to a predefined level, a message is a transmitter. Such a message can be a text message and/or an e-mail to warn an owner the LP gas level in this grill is dropping or is low. Such monitoring can be done automatically at a predefined interval or upon request.

Third, the EM (130) module may provide safety features. For example, LP gas grills have exploded due to an undetected gas leak. When the user attempts to start a burner by generating a spark, for example, the grill explodes due to excess gas from a leak. The EM (130) may be configured to monitor the gas levels around/inside the VCS (10) and perform any number of predefined functions such as: (a) disable the "spark generator," (b) generate a warning, (c) send a message (e.g., text, e-mail), and (d) turn on a vent fan.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A vented configurable structure for housing a grill element, said structure comprising:
   a main housing component comprising a housing frame defining a top portion, bottom portion, front portion, back portion, left portion and a right portion;
   a toe space area defined by the front portion along the lower part of said front portion, said toe space area comprising a vertical section and a horizontal section and wherein a toe space venting region is defined at least partially along the horizontal section of said toe space area;
   an adjustable firebox void defined by said housing frame, said adjustable firebox comprising an open box element defining cement board structure suitable for receiving a grill element for a plurality of grill element sizes and wherein said adjustable firebox void comprises at least two frame support elements defining two opposing sides of said adjustable firebox void and configured to at least partially support said grill element wherein the distance between the at least two frame support elements is selectable to vary the size of said adjustable firebox void;
   a housing cross ventilation path through said housing component;
   a cladding material mechanically associated with at least the outer surface of said front portion thereby defining a front cladding material; and
   wherein said outer surface of said right portion and said left portion are at least one of: (a) configured for being associated with a wall-element, or (b) associated with said cladding material thereby defining a side cladding material and wherein said side cladding material defines a vertically extending vent region, or (c) are configured with a housing interface configured for being mechanically associated with a side module.

2. A vented configurable structure for housing a grill element as in claim 1, wherein said housing frame is constructed from aluminum and said front cladding material and said side cladding material are constructed from fiberglass to define a low oxide-structure that does not require reapplication of a protective process to prevent material structural damage.

3. A vented configurable structure for housing a grill element as in claim 2, further comprising right module structure comprising a module left side, module right side, a module back side and a module front side defining a module toe space area, wherein the module left side of said right module structure further defines a module interface configured for being mechanically associated with said housing interface so that the module back side of said right module structure is in alignment with the back portion of said housing frame and wherein the right side of said right module structure defines at least one of (a) cladded surface defining at least one vertical venting portion comprising a plurality of venting voids or (b) an uncladded side; and
   wherein the right module structure further defines a cross ventilation path therethrough in communication with said housing cross ventilation path.

4. A vented configurable structure for housing a grill element as in claim 2, further comprising left module structure comprising a module left side, module right side, a module back side and a module front side defining a module toe space area, wherein the module right side of said left module structure further comprises a module interface configured for being mechanically associated with said housing interface so that the module back side of said left module structure is in alignment with the back portion of said housing frame and wherein the module left side defines at least one of (a) cladded surface defining at least one vertical venting portion comprising a plurality of venting voids or (b) an uncladded side; and
   wherein the left module structure further defines a cross ventilation path therethrough in communication with said housing cross ventilation path.

5. A vented configurable structure as in claim 4, wherein said toe space venting region for said housing structure is in alignment with the module toe space regions defined by said left module.

6. A vented configurable structure for housing a grill element as in claim 3, further comprising at least one door element configured for being mechanically associated with a door void defined by one of said left module or said right module and wherein said door element comprises a board element defining an inside surface and an opposing outside surface and wherein said cladding material is mechanically associate with said outside surface to minimize warping.

7. A vented configurable structure for housing a grill element as in claim 6, wherein said door element further comprises an aluminum frame configured to received said board.

8. A vented configurable structure for housing a grill element as in claim 1, wherein at least one surface of said cladding defines a wood grain feature to make the cladding look like wood.

9. A vented configurable structure as in claim 1, wherein said cladding material defines at least one of (a) an integral vertical venting portion comprising a plurality of venting voids or (b) a vertical venting module comprising a plurality of venting voids.

10. A configurable structure for housing a grill element as in claim 1, further comprising an electronic module comprising:
    a processing device associated with a memory and a power source;
    at least one senor electrically associated with said processing device and configured to generate sensor-signals relatable to at least one of (a) the status of said housing or (b) an environmental condition; and
    wherein said processing device is configured to received said sensor-signals.

11. A vented configurable structure for housing a grill element as in claim 10, further comprising communication circuits electrically associated with said processing device and configured to communicate with an external device.

12. A vented configurable structure for housing a grill element as in claim 11, wherein said at least one sensor comprises at least one of a gas sensor, power fail sensor, or a LP tank sensor.

13. A vented configurable structure for housing a grill element as in claim 9, wherein said electronic module further comprises a display.

14. A vented configurable structure with an adjustable firebox for housing a grill element, said structure comprising:
- a main housing component comprising a housing frame defining a plurality of outer portions comprising a top portion, bottom portion, front portion, back portion, left portion and a right portion;
- an adjustable firebox support structure associated with said main housing comprising a right firebox frame and a left firebox frame each defining a plurality of shelves configured to receive thermal plates wherein said thermal plates define a cement board structure;
- a cladding material mechanically associated with at least part of said plurality of outer portions wherein said cladding material associated with the front portion defines at least one of (a) a vertically extending venting element or (b) a vertically extending venting feature; and
- a toe space venting region defined horizontally along the bottom of said front portion.

15. A vented configurable structure with an adjustable firebox as in claim 14, wherein said housing frame is constructed from aluminum and said cladding is constructed from fiberglass to define a low oxide-structure that does not require reapplication of a protective process to prevent material structural damage.

16. A vented configurable structure with an adjustable firebox as in claim 15, further comprising an electronic module comprising:
- a processing device associated with a memory and a power source;
- at least one senor electrically associated with said processing device and configured to generate sensor-signals relatable to at least one of (a) the status of said housing or (b) an environmental condition; and
- wherein said processing device is configured to received said sensor-signals.

17. A vented configurable structure with a firebox for housing a grill element, said structure comprising:
- a main housing component comprising a housing frame defining a top portion, bottom portion, front portion, back portion, left portion and a right portion;
- a toe space area along the lower part of said front portion comprising a vertical section and a horizontal section;
- a cross ventilation path defined by said main house component;
- a toe space venting means for providing a horizontal venting feature;
- a firebox means for receiving a grill element;
- a cladding means for providing at least one of an aesthetic feature or a vertical venting feature and configured to be mechanically associated with at least the outer surface of said front portion;
- wherein the right portion and the left portion are at least one of: (a) configured for being associated with a wall-element, or (b) associated with said cladding material cladding material defining a vertically extending vent feature, or (c) are configured with a housing interface configured for being mechanically associated with a side module; and
- an electronic module comprising:
- a gas sensor means for generating gas sensor signals related to gas pressure;
- a housing sensor means for generating housing sensor signals related to the status of said housing;
- an environment sensor means for generating environmental sensor signals related to the environmental around said housing;
- a processor device for receiving at least one of said gas sensor signals, housing sensor signals, or environmental sensor signals and transmitting;
- a notification when at least one of when said gas sensor signals indicate at least one of (a) the gas pressure is dropping or (b) the gas pressure has dropped below a predefined lower limit; or
- a notification when said housing sensor signals meet predefined criteria; or
- a notification when said environmental sensor met predefined criteria.

* * * * *